United States Patent [19]

Takagi

[11] Patent Number: 5,319,416

[45] Date of Patent: Jun. 7, 1994

[54] EXPOSURE CALCULATION DEVICE FOR CAMERA

[75] Inventor: Tadao Takagi, Yokohama, Japan

[73] Assignee: Nikon Corporation, Tokyo, Japan

[21] Appl. No.: 774,186

[22] Filed: Oct. 10, 1991

[30] Foreign Application Priority Data

Oct. 16, 1990 [JP] Japan .................................. 2-275202

[51] Int. Cl.$^5$ .............................................. G03B 7/08
[52] U.S. Cl. .................................................... 354/432
[58] Field of Search ........................ 354/432, 403, 412

[56] References Cited

U.S. PATENT DOCUMENTS

| 4,364,650 | 12/1982 | Terashita et al. ...................... 354/31 |
| 4,423,936 | 1/1984 | Johnson ................................. 354/403 |
| 4,643,557 | 2/1987 | Ishi Zaki et al. ..................... 354/432 |
| 4,843,417 | 6/1989 | Ishida et al. ..................... 354/432 X |
| 4,929,824 | 5/1990 | Miyazaki .............................. 364/525 |
| 4,969,005 | 11/1990 | Tokunaga ......................... 354/432 X |
| 5,128,707 | 7/1992 | Muramatsu ..................... 354/432 X |

FOREIGN PATENT DOCUMENTS 0416904 3/1991 European Pat. Off. .
3-174127 7/1991 Japan .

OTHER PUBLICATIONS

Patent Abstracts of Japan, vol. 8, No. 271, (P-320) (1708) Dec. 12, 1984.

Primary Examiner—Michael L. Gellner
Assistant Examiner—Jae N. Noh
Attorney, Agent, or Firm—Shapiro and Shapiro

[57] ABSTRACT

An exposure calculation device for cameras is equipped with: a divisional photometry device having a plurality of photometer elements for performing photometry respectively on each of a plurality of divisional areas constituting a field; a photoelectric transfer element array for performing photometry on at least a part of the field; an edge detection device, which determines a boundary section defining on the photoelectric transfer element array a higher-photometry-output region and a lower-photometry-output region and which outputs edge information on this boundary section; a selection device, which selects at least one of the photometer elements of the divisional photometry device on the basis of the edge information, exposure calculation being enabled by the photometry output of the photometer element thus selected; and an exposure calculation device, which calculates a correct exposure for a principal object in the field on the basis of the photometry output of the selected photometer element.

13 Claims, 20 Drawing Sheets

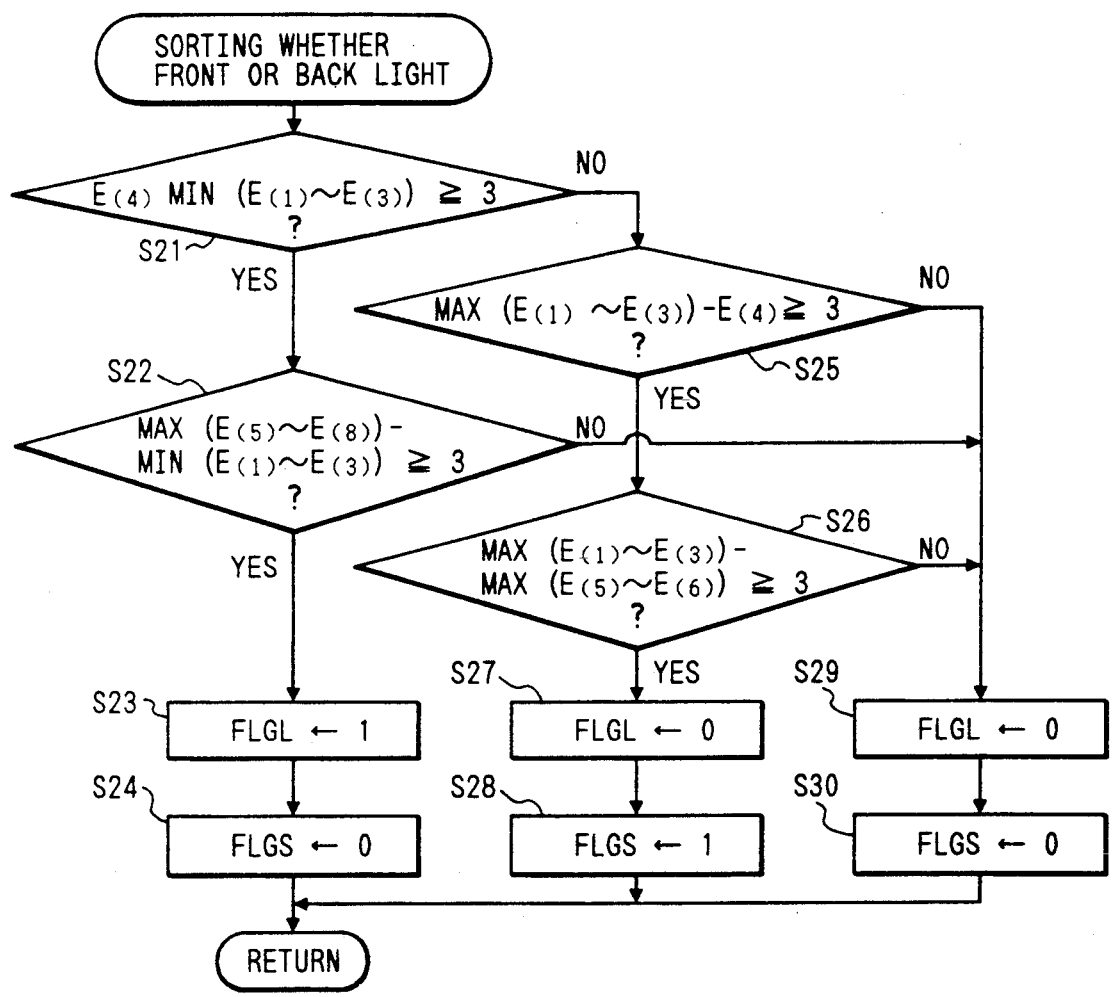

FIG. 6B-1
FIG. 6B
| FIG. 6B-1 |
| FIG. 6B-2 |
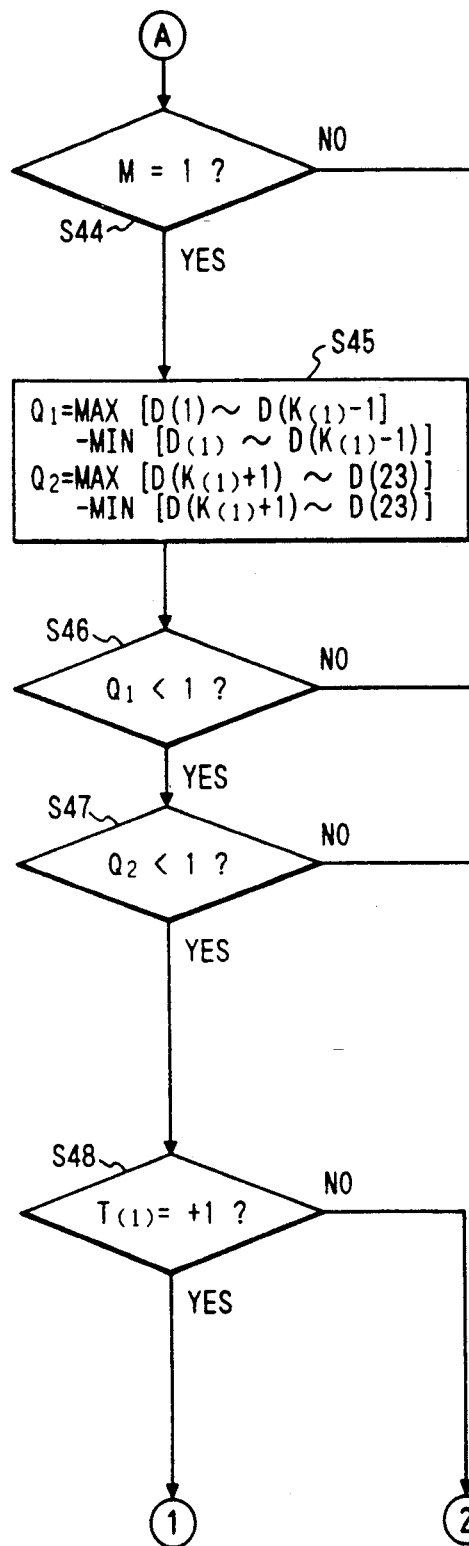
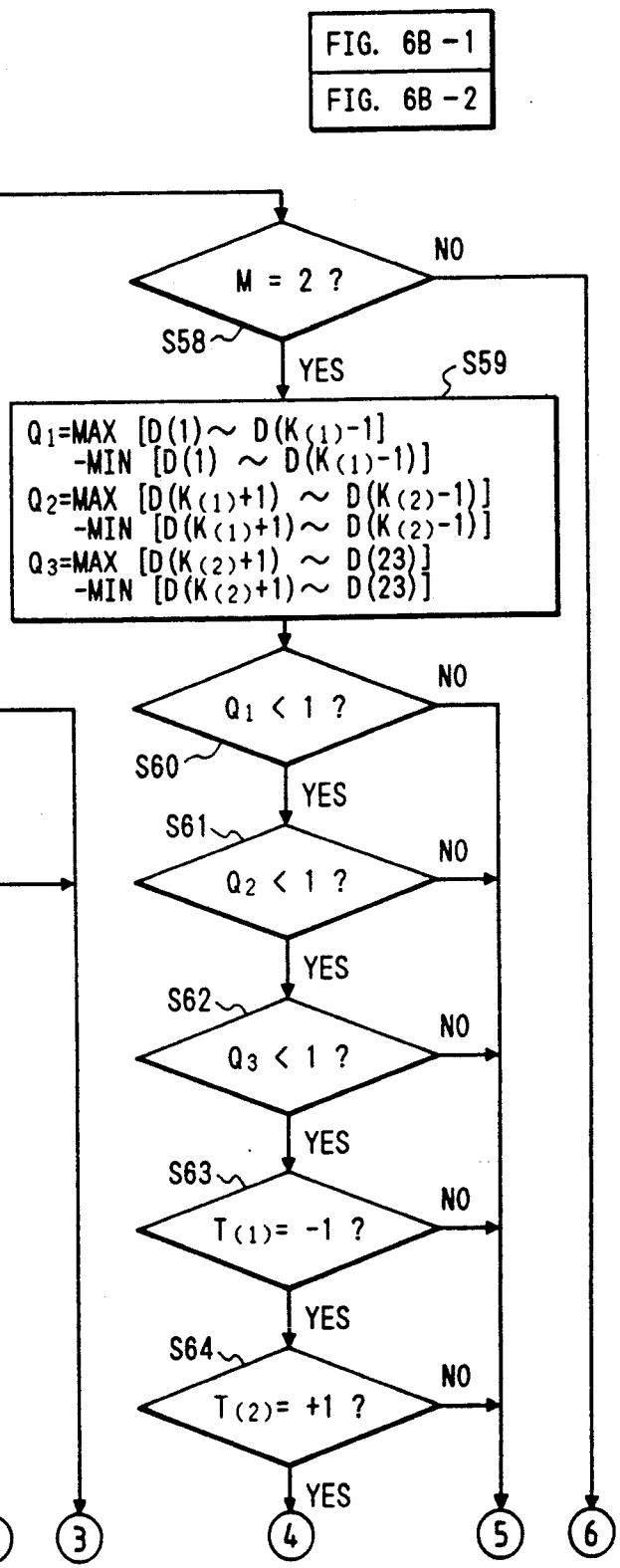

FIG. 11B-1
FIG. 11B
| FIG. 11B-1 |
| FIG. 11B-2 |
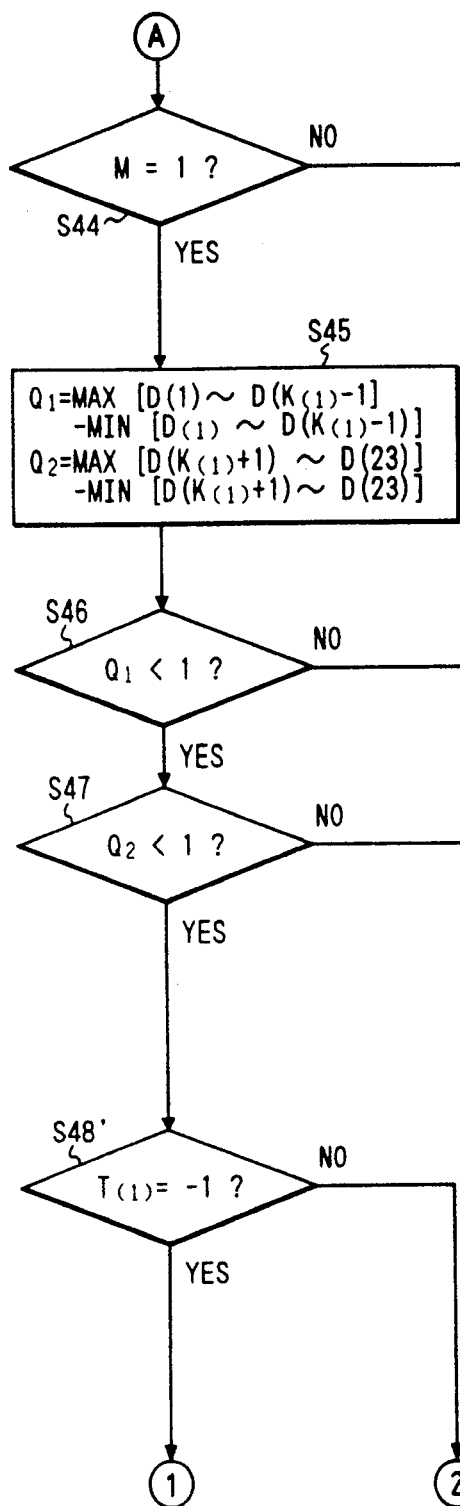
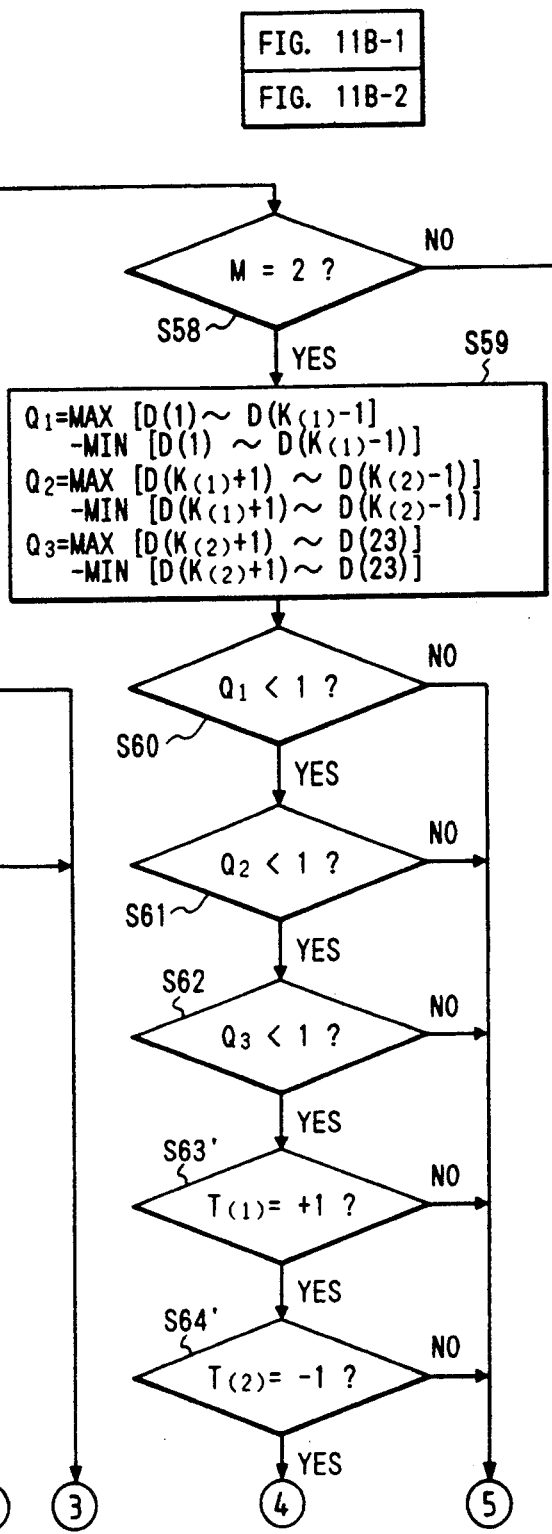

EXPOSURE CALCULATION DEVICE FOR CAMERA

BACKGROUND OF THE INVENTION

1. Field of the Invention

This invention relates to an exposure calculation device for cameras.

2. Related Background Art

The present applicant has proposed an exposure calculation device for cameras, in which focus detection is carried out for a principal object in a photographic frame by a focus detecting device; the result of the focus detection is utilized to obtain the respective defocus amounts in the different photometric areas of a divisional photometer device, effecting weighting on the respective photometry outputs of the photometric areas; whereby a correct exposure for the principal object is calculated (see Japanese Patent Application No. 1-231041).

The above exposure calculation device, however, has the following problem: In the case of a sharply backlighted principal object, the photometry output is excessively low in that portion of the photoelectric transfer element array of the focus detecting device which corresponds to the principal object, so that defocus amount detection cannot be effected, making it impossible to calculate a correct exposure for the principal object.

If, on the other hand, the principal object is being spotlighted against a dark background, i.e., if it is in a sharply front-lighted condition, the photometry output is at an excessively high level in that portion of the photoelectric transfer element array of the focus detecting device which corresponds to the principal object, which means that the defocus amount of that portion cannot be detected, thus involving the same problem as in the above case.

SUMMARY OF THE INVENTION

It is an object of this invention to provide an exposure calculation device for cameras which is capable of calculating a correct exposure for a principal object in a backlighted or front-lighted condition.

Referring to FIG. 1A, which corresponds to the present invention, the above object is achieved, according to this invention, by an exposure calculation device for cameras, comprising: a divisional photometry means 100, which performs photometry on a photographic frame divided into a plurality of divisional photometric areas; a photoelectric transfer element array 101, which performs overlapping photometry on at least part of the photometric areas; an edge detection means 102, which detects edge information on a principal object image on the basis of the photometry output of this photoelectric transfer element array 101; a selection means 103, which selects at least one of the photometry outputs of the different photometric areas of the divisional photometer means 100 on the basis of the edge information supplied from this edge detection means 102; and an exposure calculation means 104, which calculates a correct exposure for the principal object on the basis of the photometry output of the photometric area selected by this selection means 103.

The photoelectric transfer element array 101 of the exposure calculation device for cameras of this invention constitutes one of the pair of photoelectric transfer arrays of the focus detecting device for performing focus detection on the principal object image.

Referring to FIG. 1B, which corresponds to this invention, the exposure calculation device for cameras of this invention may be further equipped with a judgment means 105A, which makes a judgment, on the basis of the photometry output of the photometric areas of the divisional photometry means 100, as to whether a principal object image in a photographic frame is in a backlight condition or not; when the image is judged to be in a backlight condition, the selection means 103 selects the photometry output of those photometric areas which are on that side of the edge of the object where the photometric output is lower.

Further, referring to FIG. 1B, which corresponds to this invention, the exposure calculation device for cameras of this invention may be further equipped with a judgment means 105B, which makes a judgment, on the basis of the photometry output of the photometric areas of the divisional photometry means 100, as to whether a principal object image in a photographic frame is in a front-light condition or not; when the image is judged to be in a front-light condition, the selection means 103 selects the photometry output of those photometric areas which are on that side of the edge of the object where the photometric output is higher.

With the exposure calculation device for cameras of this invention, the edge detection means 102 detects edge information on a principal object image on the basis of the photometry output of the photoelectric transfer element array 101, and, on the basis of this edge information, the selection means 103 selects at least one of the photometry outputs of the photometric areas of the divisional photometry means 100. And the exposure calculation means 104 calculates a correct exposure for the principal object on the basis of the photometry output of the photometric area selected by the selection means 103.

When the principal object is judged by the judgment means 105A to be in a backlight condition, the selection means 103 of the exposure calculation device for cameras of this invention selects the photometry output of those photometric areas which are on that side of the edge of the object where the photometry output is lower.

When the principal object is judged by the judgment means 105B to be in a front-light condition, the selection means 103 of the exposure calculation device for cameras of this invention selects the photometry output of those photometric areas which are on that side of the edge of the object where the photometry output is higher.

BRIEF DESCRIPTION OF THE DRAWINGS

FIG. 5 is a flowchart showing a subroutine for front-light/backlight sorting;

FIGS. 6A, 6B-1 and 6B-2 are flowcharts showing a subroutine for sorting the wave-shapes of the outputs of the photoelectric transfer element array for the focus detection in the case of an object in a backlight condition;

FIGS. 11A, 11B-1 and 11B-2 are flowcharts showing a subroutine for sorting the wave shapes of the outputs of the photoelectric transfer element array for the focus detection in the case of an object in a front-light condition;

DETAILED DESCRIPTION OF THE PREFERRED EMBODIMENTS

Figure 1A:
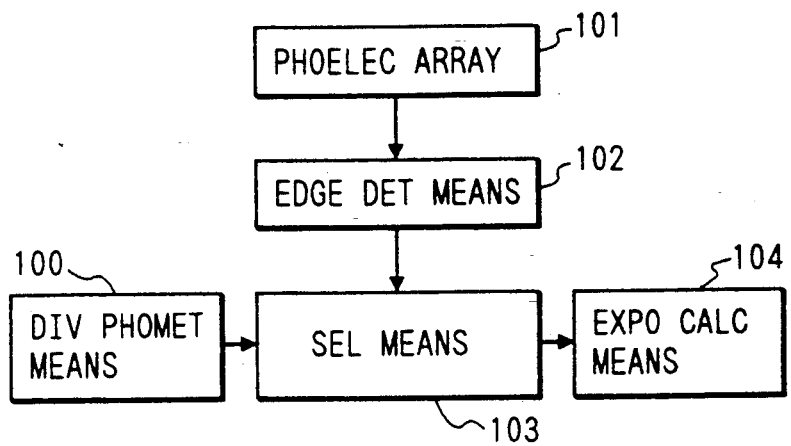
FIGS. 1A and 1B are block diagrams of exposure calculation devices corresponding to appended claims.
Figure 1B:
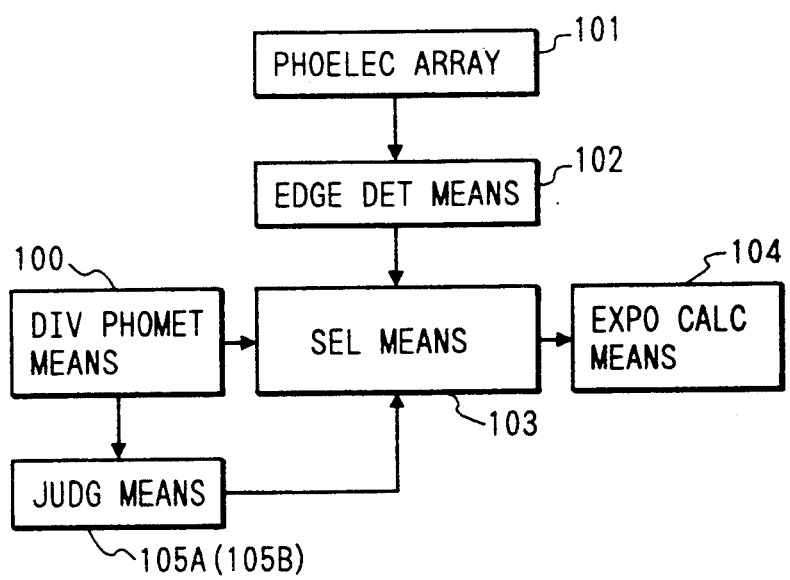
Figure 2:
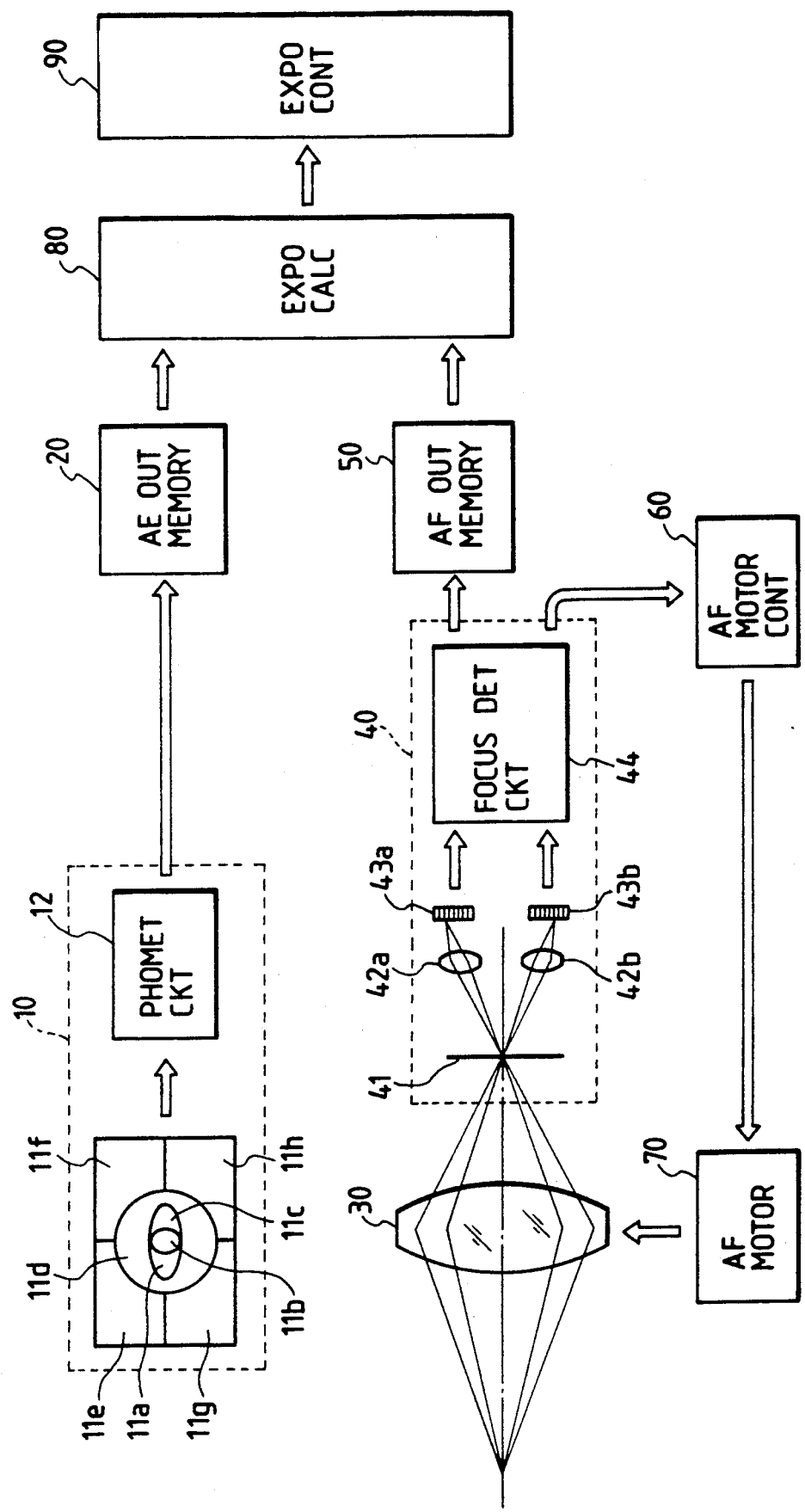
FIG. 2 is a block diagram showing the general construction of an exposure calculation device in accordance with an embodiment of this invention.

FIG. 2 is a diagram showing the general construction of an embodiment of this invention.

Figure 3:
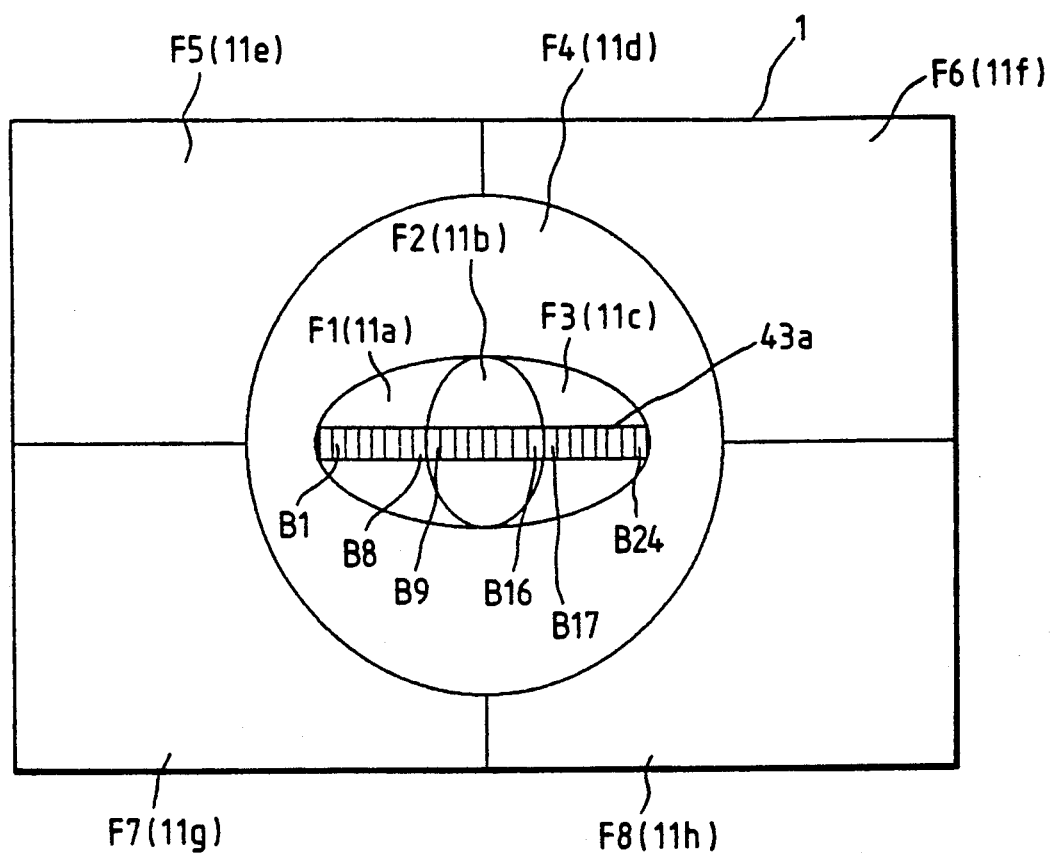
FIG. 3 is a diagram showing an arrangement of divisional photometric areas and of a photoelectric transfer element array for focus detection.

In the drawing, the reference numeral 10 indicates a divisional photometry section, which, as shown in FIG. 3, performs photometry by divisional photometer elements 11a to 11h arranged in correspondence with the divisional photometric areas, F1 to F8, of a photographic frame 1. The divisional photometer element 11a performs photometry on the photometric area F1, and the divisional photometer element 11b performs photometry on the photometric area F2. Likewise, the divisional photometer elements 11c to 11h perform photometry on the photometric areas F3 to F8, respectively. The reference numeral 12 indicates a photometric circuit, which converts photometric signals from the divisional photometer elements 11a to 11f into photometry values E (n) (n=1~8, in the unit of BV), and outputs the same. The reference numeral 20 indicates an AE output memory for storing these photometry values E(1)~E(8).

The reference numeral 30 indicates a photographic lens, and the reference numeral 40 indicates a focus detecting section which is well known. Light having passed through different regions of the photographic lens 30 forms an image on a predetermined focal plane 41 which is conjugate with the photographic film (not shown), and further, forms an image on each of photoelectric transfer element arrays 43a and 43b by means of re-imaging lenses 42a and 42b, respectively. Each of the photoelectric transfer element arrays 43a and 43b is composed, for example, of twenty-four CCD-type photoelectric transfer elements, supplying a focus detection circuit 44 with a pair of electrical signals corresponding to the light quantity distribution in the object image. The photoelectric transfer arrays 43a and 43b may consist of MOS-type photoelectric transfer elements, instead of CCD-type ones. The focus detection circuit 44 calculates the distance between the object-image plane of the photographic lens 30 and the predetermined focal plane 41 as measured along the optical axis, i.e., the defocus amount, on the basis of the relative shift between the pair of object image signals supplied from the photoelectric transfer element arrays 43a and 43b. Further, the focus detection circuit 44 converts electrical signals from the photoelectric transfer elements of one photoelectric transfer element arrays, 43a into photometry values B(n) (n=1~24, in the unit of BV), and outputs the same. As shown in FIG. 3, the photoelectric transfer element array 43a is arranged in correspondence with the photometric areas F1 to F3, and the respective photometry values of the photoelectric transfer elements are referred to as B(1)~B(24), from the left to the light. Thus, the photometry values B(1) to B(8) correspond to the photometric area F1; the photometry values B(9) to B(16) correspond to the photometric area F2; and the photometry values B(17) to B(24) correspond to the photometric area F3.

Further, the reference numeral 50 indicates an AF output memory for storing the photometry values B(1) to B(24) as calculated by the focus detection circuit 44. The reference numeral 60 indicates an AF motor controller, which controls an AF motor 70 by calculating lens drive amount for the photographic lens 30 on the basis of the defocus amount. The AF motor 70 drives the photographic lens 30 in accordance with the lens drive amount to focus the same.

The reference numeral 80 indicates an exposure calculating section composed of a microcomputer and peripheral components thereof and adapted to perform exposure calculation on the basis of the photometry values E(1) to E(8) stored in the AE output memory 20 and the photometry values B(1) to B(24) stored in the AF output memory 50. The reference numeral 90 indicates an exposure control section, which obtains shutter speed and stop on the basis of the exposure value calculated by the exposure calculating section 80, thereby controlling the shutter and stop-down mechanism section (not shown).

Figure 4:
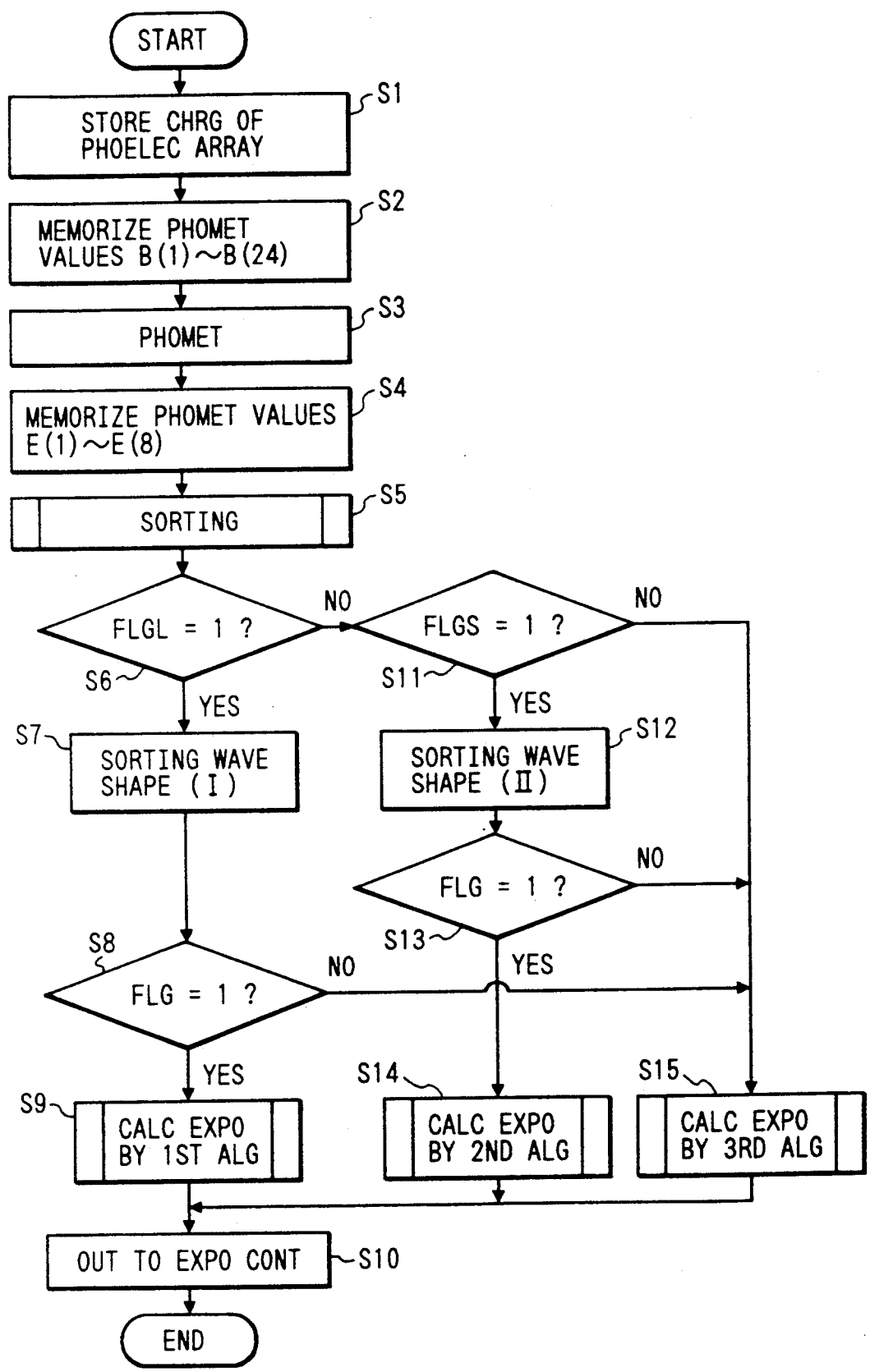
FIG. 4 is a flowchart showing an exposure calculation program.

FIG. 4 is a flowchart showing an exposure calculation program executed by the exposure calculating section 80. The operation of the exposure controller will be described with reference to this flowchart.

In step S1, electric charge is stored in the photoelectric transfer element arrays 43a and 43b to detect the photometry values B(1) to B(24). Then, in step S2, these photometry values B(1) to B(24) are stored in the AF output memory 50. In step S3, photometry is performed on each of the photometric areas F1 to F8 by the divisional photometry section 10 to detect the above-mentioned photometry values E(1) to E(8). Afterwards, the procedure moves on to step S4, where these photometry values E(1) to E(8) are stored in the AE output memory 20.

Next, in step S5, the front-light/backlight sorting subroutine shown in FIG. 5 is executed, making a judgment as to whether the principal object is in a front-light or a backlight condition. The sorting is performed as follows: The photometric areas F1 to F8 shown in FIG. 3 are previously divided into the following three domains: a central domain consisting of the areas F1 to F3; a domain surrounding the same, i.e., the area F4; and an outermost domain consisting of the areas F5 to F8; the domains being compared with each other in terms of brightness on the basis of their respective maximum or the minimum photometry values. When the central domain is the darkest and the other domains get brighter toward the periphery, it is determined that the principal object is in a backlight condition, and, if, conversely, the central domain is the brightest and the other ones get darker toward the periphery, the principal object is judged to be in a front-light condition.

In step S21 of FIG. 5, the minimum photometry value of the central domain consisting of the areas F1 to F3 is compared with the photometry value of the surrounding domain consisting of the area F4, by the following inequality:

$$E(4) - MIN\{E(1) \sim E(3)\} \geq 3 \tag{1}$$

If the comparison result satisfies the above inequality, that is, if the surrounding area F4 is brighter by 3BV or more, the procedure moves on to step S22. If the comparison result does not satisfy the inequality, the procedure moves on to step S25. In step S22, the maximum photometry value of the outermost domain, consisting of the areas F5 to F8, is compared with the minimum photometry value of the central domain consisting of the areas F1 to F3, by the following inequality:

$$MAX\{E(5) \sim E(8)\} - MIN\{E(1) \geq E30 = \geq 3 \tag{2}$$

If the comparison result satisfies the above inequality, the procedure moves on to step S23, and, if not, the procedure moves on to step S29. In the case where the procedure moves on to step S23, the central areas F1 to F3 are darker than the peripheral areas F4 to F8 by 3BV or more, so that the central areas are regarded to be in a backlight condition, and a flag FLGL indicative of backlight condition is set; in the subsequent step S24, a flag FLGS indicative of front-light condition is reset, the procedure moving on to "RETURN".

In step S25, the maximum photometry value of the central domain consisting of the areas F1 to F3 is compared with the photometry value of the domain surrounding the same, i.e., the photometric area F4, by the following inequality:

$$MAX\{E(1) \sim E(3)\} - E(4) \geq 3 \tag{3}$$

If the comparison result satisfies the above inequality, that is, if the central areas F1 to F3 are brighter than the peripheral area by 3BV or more, the procedure moves on to step S26; otherwise, the procedure moves on to step S29. In step S26, the maximum photometry value of the central domain consisting of the areas F1 to F3 is compared with the maximum photometry value of the outermost domain consisting of the areas F5 to F8, by the following inequality:

$$MAX\{E(1) \sim E(3)\} - MAX\{E(5) \sim E(8)\} \geq 3 \tag{4}$$

If the comparison result satisfies the above inequality, the procedure moves on to step S27; if not, the procedure moves on to step S29. In the case where the procedure moves on to step S27, the central areas F1 to F3 are brighter than the peripheral areas by 3BV or more, so that the central areas are regarded to be in a front-light condition, with a flag FLGL indicative of backlight condition being reset; in the subsequent step S28, a flag FLGS indicative of front-light condition is set, the procedure moving to "RETURN".

If it is determined that the principal object is in neither a backlight nor a front-light condition, the flags FLGL and FLGS are respectively reset in steps S29 and S30, the procedure moving on to "RETURN".

Referring again to FIG. 4, the calculation program will be further described.

When the backlight/front-light judgment has been made in step S5, the procedure moves on to step S6, where a judgment is made as to whether the flag FLGL indicative of backlight condition has been set or not. If it has been set, the procedure moves on to step S7; if not, the procedure moves on to step S11.

Figure 6A:
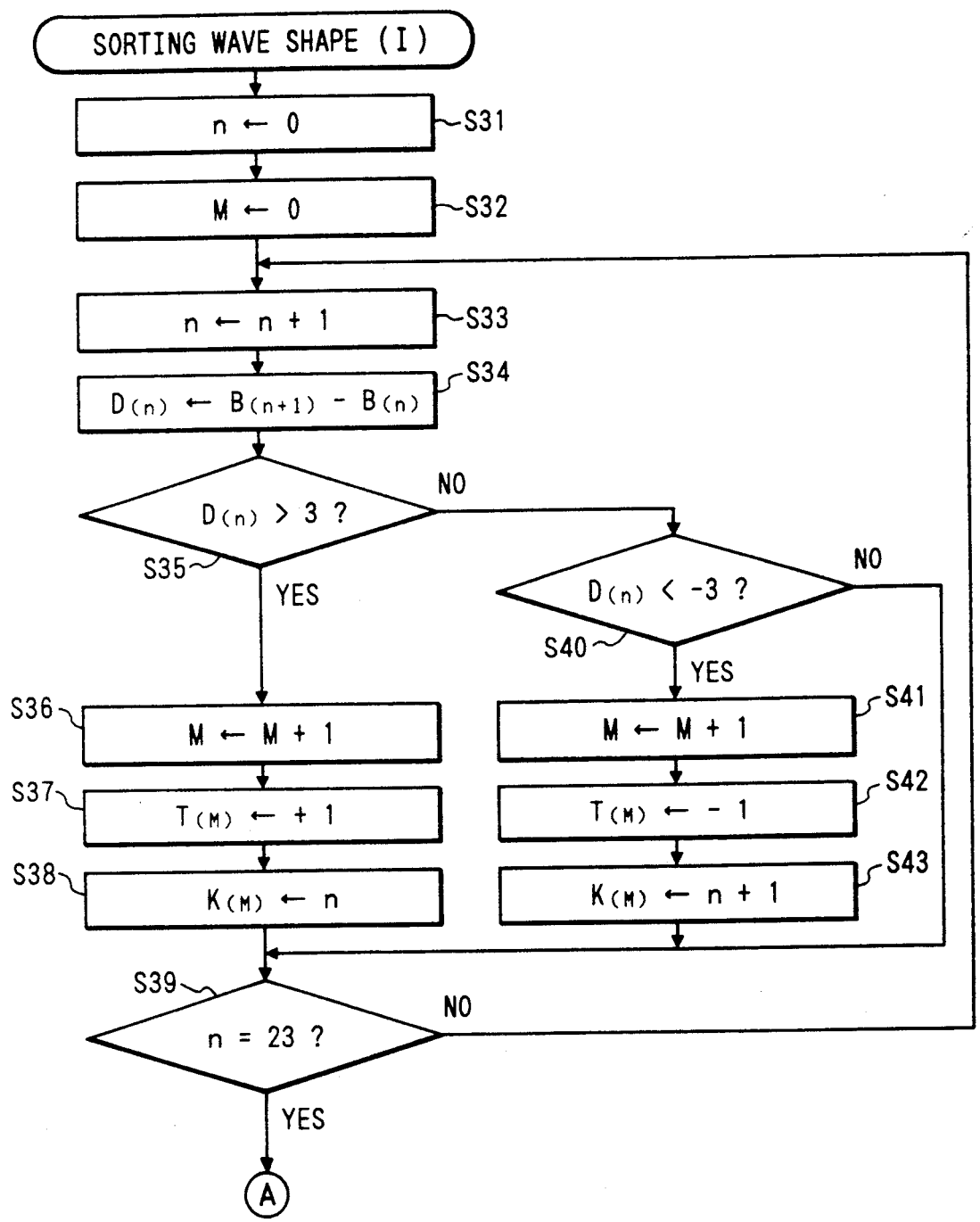
Figures 2, 6B:
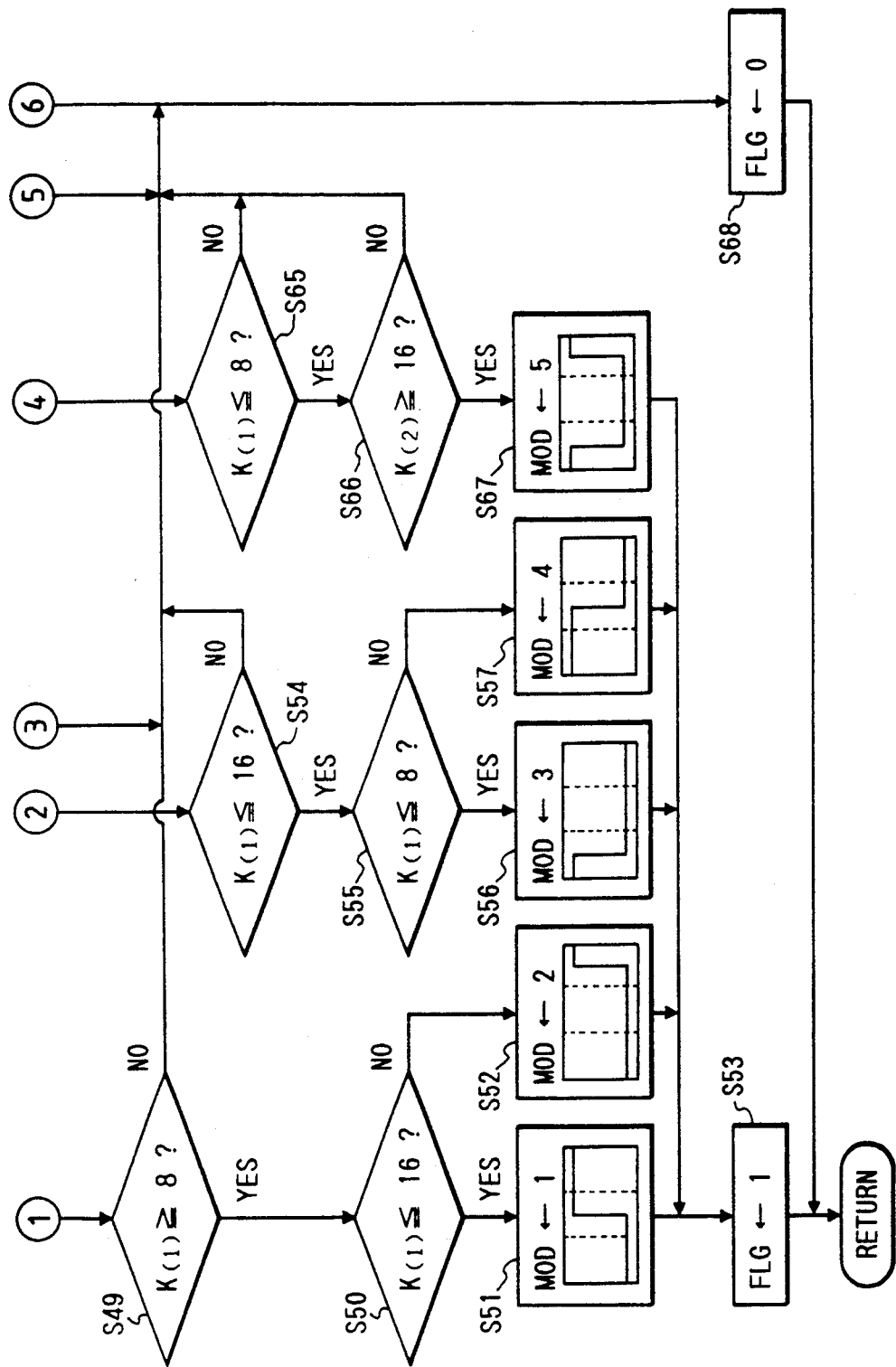

In step S7, the subroutine shown in FIGS. 6A and 6B is executed, performing wave-shape sorting on the output of the photoelectric transfer element array 43a. This sorting consists in sequentially examining the output of the photoelectric transfer element array 43a to detect any section where a radical change occurs in photometry value, i.e., a position where an edge of the principal object is detected and observing the way the change in photometry value occurs in that section. In this embodiment, the principal object consists of a human figure.

In step S31 of FIG. 6A. the element number n on the photoelectric transfer element array 43a is reset to 0, and, in the subsequent step, S32, a counter M for counting the number of edges detected between the figure and the background is reset. In step S33, the element number n is incremented, and the procedure moves on to step S34, where the difference in photometry values between adjacent photoelectric transfer elements, D(n), is obtained by the following equation:

$$D(n) = B(n+1) - B(n) \tag{5}$$

where $n = 1 \sim 23$.

Next, in step S35, a judgment is made as to whether the difference S(n) is larger than $+3BV$ or not. If the result of the judgment is affirmative, the procedure moves on to step S36; if not, the procedure moves on to step S40. When $D(n) > +3BV$, the photometry value has changed from a smaller to a larger one, so that the edge is a section where a darker portion passes into a brighter one. In that case, the number of edges, M, is incremented in step S36, and then the procedure moves on to step S37, storing $+1$ in a memory T(M) indicative of the way the photometric value changes across that edge. That is, if that edge is the first one to be detected, $T(1) = +1$. Next, the procedure moves on to step S38, where the element number n when that edge was detected is stored in a memory K(M) indicative of edge positions. That is, if the edge was first discovered when the photoelectric transfer element number n was 1, $K(1) = 1$.

If the judgment result in step S35 is: $D(n) \leq +3BV$, a judgment is made in step S40 as to whether the difference D(n) is smaller than $-3BV$ or not. If it is smaller than that, the procedure moves on to step S41; if not, the procedure moves on to step S39. When $D(n) < -3BV$, the photometry value has changed from a larger to a smaller one, so that the edge is a section where a brighter portion passes into a darker one. In that case, the edge number M is incremented in step S41, and in the subsequent step, S42, $-1$ is stored in the memory T(M) indicative of the way the photometry value changes. Further, in step S43, the element number n when that edge was discovered is stored in the memory K(M) indicative of positions.

Next, in step S39, a judgment is made as to whether the element number n is 23 or not, that is, whether the photometry outputs of all the photoelectric transfer elements have been examined or not. If the examination has been completed, the procedure moves on to step S44 of FIG. 6B; if not, the procedures returns to step S33.

In step S44, a judgment is made as to whether the number of discovered edges M is one or not. If it is, the procedure moves on to step S45; otherwise, the procedure moves on to step S58. Here, the photoelectric transfer element array 43a is divided into two regions across the position K(1), where the edge has been found: the region "before" the discovery of the edge and the region "after" the same. In step S45, the difference between the maximum photometry-value difference D(n) and the minimum photometry-value difference D(n), in the region before the discovery, is obtained by the following equation:

$$Q1 = MAX\{D(1) \sim D(K(1)-1)\} - MIN\{D(1) \sim D(K(1)-1)\} \tag{6}$$

Further, the difference between the maximum photometry-value difference D(n) and the minimum photometry-value difference D(n), in the region after the discovery, is obtained by the following equation:

$$Q2 = MAX\{D(K(1)+1) \sim D(23)\} - MIN\{D(K(1)+1) \sim D(23)\} \tag{7}$$

Then, in step S46, a judgment is made as to whether the difference Q1 is smaller than +1BV or not. If Q1<1, the procedure moves on to step S47; if not, it moves on to step S68. In the subsequent step, S47, a judgment is made as to whether the difference, Q2 is smaller than +1BV or not. If Q2<1, the procedure moves on to step S48; if not, it moves on to step S68. If the results of the steps S46 and S47 have both been affirmative, there is no great change in photometry value in either of the regions across the section where an edge has been discovered between the human figure and the background thereof. Accordingly, it is to be assumed that the figure is in a sharply backlighted scene.

In step S48, a judgment is made as to whether the memory T(1) indicative of the way the photometric value changes is +1 or not, i.e., whether that edge is a section where a darker portion passes into a brighter one or not. If the result of this judgment is affirmative, the procedure moves on to step S49; if the result is negative, the procedure moves on to step S54. In step S49, a judgment is made as to whether or not the position of that edge, K(1), corresponds to an element of the photoelectric transfer element array 43a whose element number is 8 or more. If the result is affirmative, the procedure moves on to step S50; if it is negative, the procedure moves on to step S68. Further, in step S50, a judgment is made as to whether or not that position K(1) corresponds to an photoelectric transfer element whose element number is 16 or less. If the judgment result is affirmative, the procedure moves on to step S51; if it is negative, the procedure moves on to step S52. If the edge is in the range: 8≦K(1)≦16, i.e., in the photometric area F2, "1" is stored, in step S51, in a memory MOD indicative of output wave-shape pattern. If the edge is in the range: K(1)>16, i.e., in the photometric area F3, "2" is stored in the memory MOD in step S52.

If the result of step S48 is negative, it is determined that the memory T(1) is −1, i.e, that the edge is at a position where a brighter region passes into a darker one, and the procedure moves on to step S54, where a judgment is made as to whether or not the edge position K(1) corresponds to an element number 16 or less. If K(1)≦16, the procedure moves on to step S55; if not, the procedure moves on to step S68. In step S55, a judgment is made as to whether K(1)≦8 8 or not. If the judgment result is affirmative, the procedure moves on to step S56; if it is negative, the procedure moves on to step S57. In step S56, the edge is in the photometric area F1, "3" being stored in the memory MOD. In step S57, on the other hand, the edge is in the photometric area F2, and "4" is stored in the memory MOD.

Next, if the result of step S44 is negative, i.e., if the number of edges M is not one, the procedure moves on to step S58, where a judgment is made as to whether the number of edges, M, is two or not. If M=2, the procedure moves on to step S59; if not, the procedure moves on to step S68. Here, the photoelectric transfer element array 43a is divided into three regions across the positions K(1) and K(2), where edges have been discovered: a pre-discovery region, an intermediate region, and a post-discovery region. First, the difference Q1 between the maximum photometry-value difference D(n) and the minimum photometry-value difference D(n), in the pre-discovery region, is obtained by he following equation:

$$Q1 = MAX\{D(1) \sim D(K(1)-1)\} - MIN\{D(1) \sim D(D(1) -1)\} \tag{8}$$

Likewise, the difference Q2 in the intermediate region and the difference Q3 in the post-discovery region are respectively obtained by the following equations:

$$Q2 = MAX \{D(K(1)+1) \sim D(K(2)-1)\} - MIN\{D(K(1)+1) \sim D(K(2)-1)\} \tag{9}$$

$$Q3 = MAX \{D(K(2)+1) \sim D(23)\} - MIN\{D(K(2)+1) \sim D(23)\} \tag{10}$$

In the subsequent steps, S60 to S62, a judgment is made as to whether the differences Q1 to Q3 are smaller than +1BV or not. If Q1 to Q3 are all smaller than +1BV, the procedure moves on to step S63; if any one of them is +1BV or more, the procedure moves on to step S68. That is, the fact that Q1 to Q3 are all smaller than +1BV indicates a small change in photometry value in the above three regions, and, as in the above case, it is to be assumed that the figure is in a sharply backlighted scene.

In step S63, a judgment is made as to whether the memory T(1)= −11, i.e., whether or not the first one of the two edges is a section where a brighter region passes into a darker one. If the judgment result is affirmative, the procedure moves on to step S64; if it is negative, the procedure moves on to step S68. In step S64, a judgment is made as to whether the memory T(2)= +1, i.e., whether or not the second edge is a place where a darker region passes into a brighter one. If the result is affirmative, the procedure moves on to step S65; if it is negative, the procedure moves on to step S68. In step S65, a judgment is made as to whether or not the first edge position K(1) corresponds to an element number equal to or smaller than eight. If it is so, the procedure moves on to step S66; if not, it moves on to step S68. In step S66, a judgment is made as to whether or not the second edge position K(2) corresponds to an element number equal to or larger than sixteen. If it is so, the procedure moves on to step S67; if not, it moves on to step S68. In step S67, it is determined that the sharply backlighted figure is in the photometric areas F1 to F3, and "5" is set in the memory MOD.

When the above processing has been terminated, the procedure moves on to step S53, where a flag FLG is set which indicates that the wave-shape sorting on the output of the photoelectric transfer element array 43a has been completed. In step S68, on the other hand, it is determined that output wave-shape sorting cannot be performed, the flag FLG being cleared. Afterwards, the procedure returns to the program shown in FIG. 4.

In step S8 of FIG. 4, a judgment is made from the flag FLG as to whether the wave-shape sorting on the output of the photoelectric transfer element array 43a has been completed or not. If it has been completed, the procedure moves on to step S9, where exposure calculation is performed in accordance with the first algorithm shown in FIG. 7; if the output wave-shape sorting has not been completed yet, the procedure moves on to step S15, where exposure calculation is performed in accordance with the third algorithm shown in FIG. 13.

Next, the first algorithm will be explained with reference to the flowchart of FIG. 7.

Figure 7:
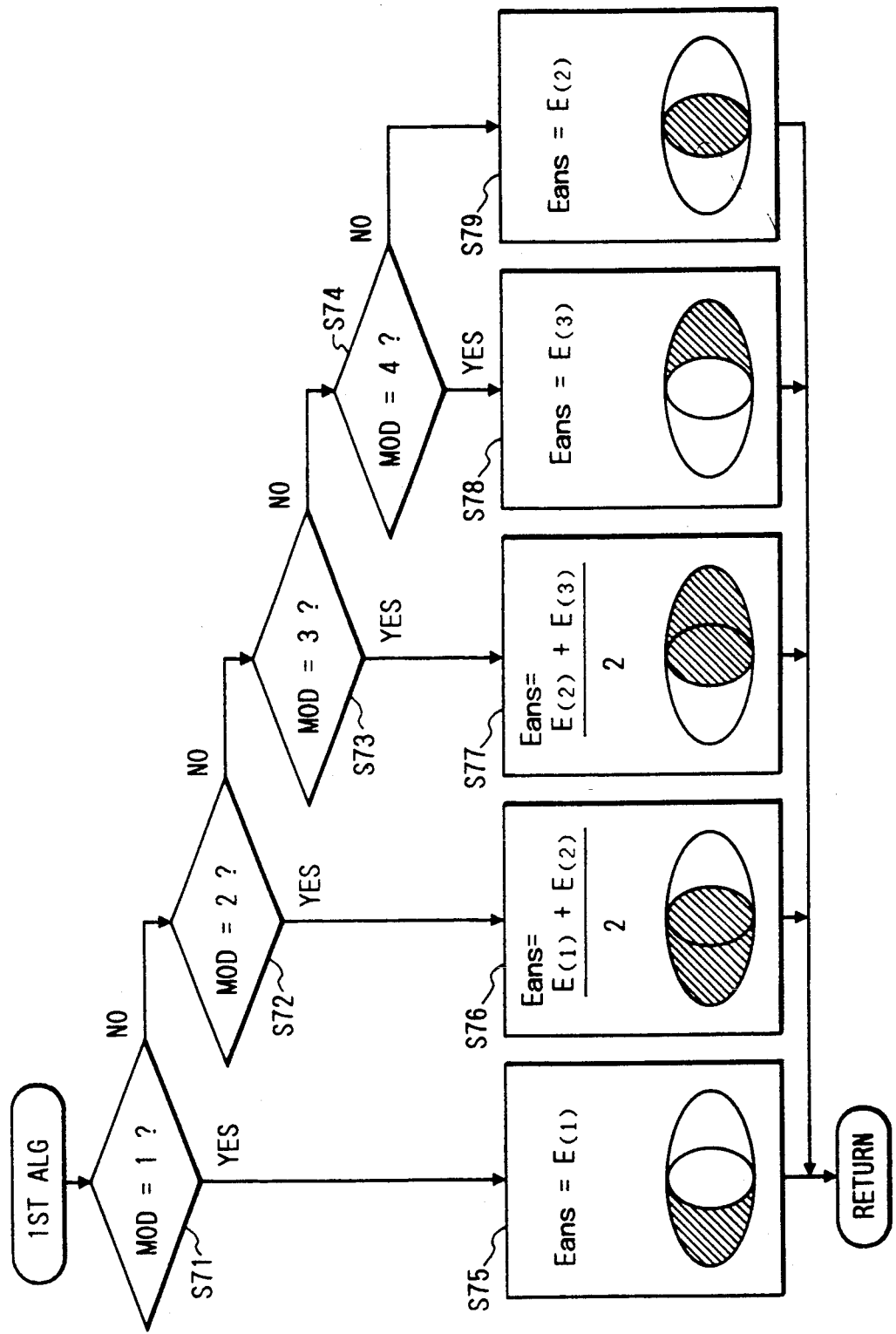
FIG. 7 is a flowchart showing a first algorithm for exposure calculation.

In steps S71 to S74 of FIG. 7, the output wave-shape pattern numbers stored in the memory MOD are sequentially checked, and, in accordance with the output wave-shape pattern, a correct exposure Eans for the principal object is determined by one of the equations shown in steps S75 to S79, the procedure moving on to "RETURN".

Figure 8A:
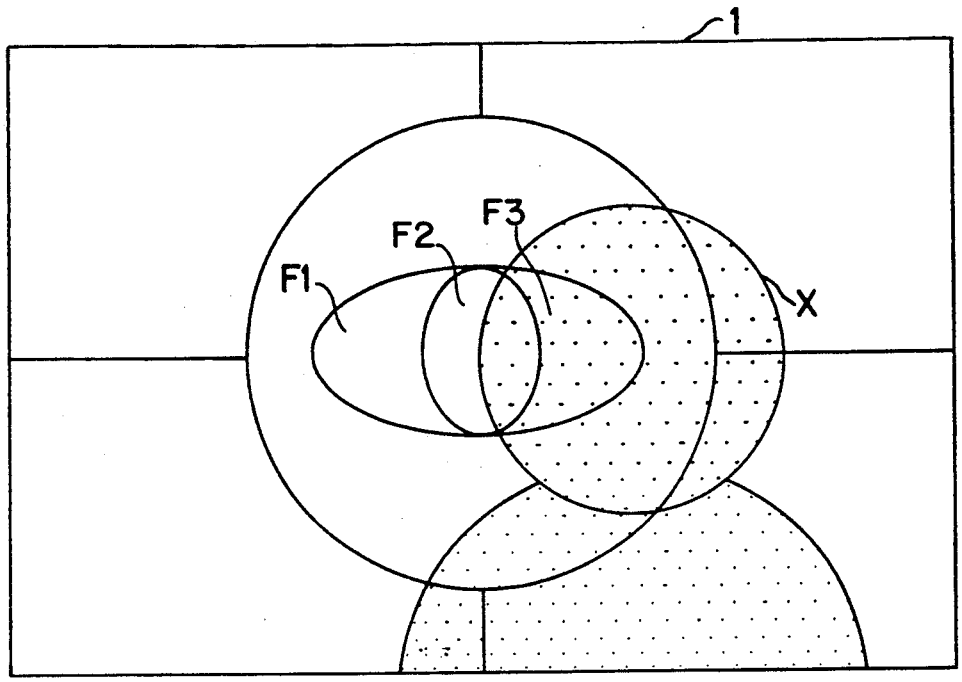
FIGS. 8A, 8B, 8C, 8D, 9A, 9B, 9C, 9D, 10A, 10B, 10C and 10D are diagrams showing examples of exposure calculation for a figure situated at various positions in a photographic frame when in a backlight condition.
Figure 8B:
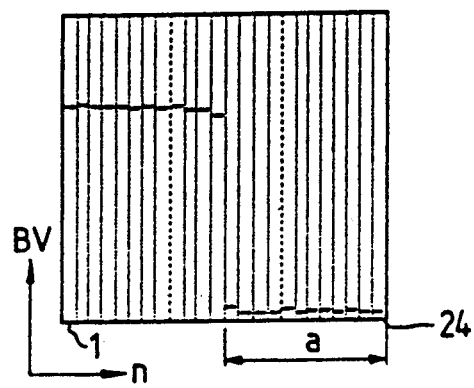
Figure 10A:
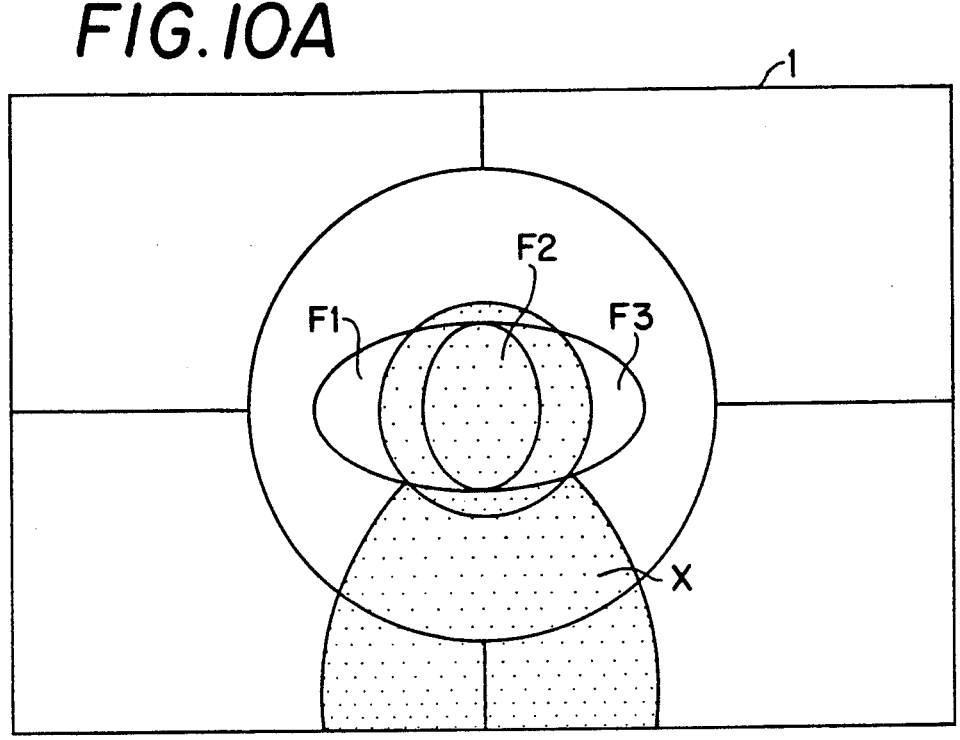
Figure 10B:
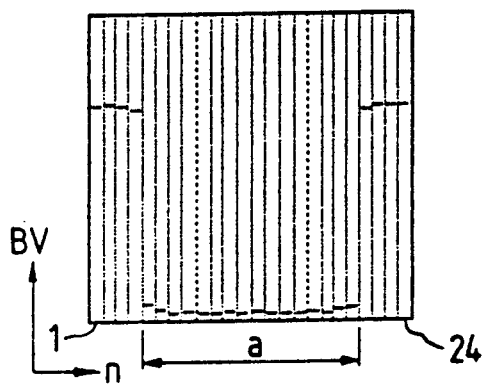
Figure 10C:
Figure 10D:
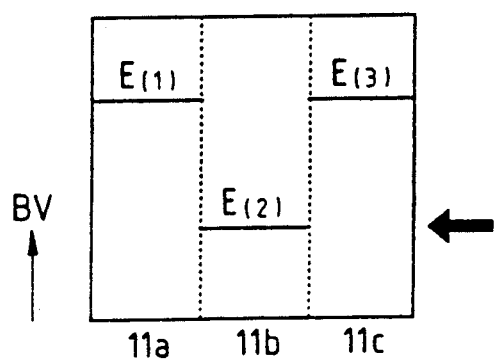

FIGS. 8A to 10D show examples of exposure calculation for the principal object in the backlight condition as described above. FIGS. 8A, 9A and 10A show positional relationships between the photographic frame 1 and the human figure X. FIGS. 8B, 9B and 10B show the respective outputs of the photoelectric transfer array for focus detection 43a for these positional relationships; the horizontal axis represents the photoelectric-transfer-element numbers n, and the vertical axis represents the respective photometry values B(1) to B(24) (BV) of the photoelectric transfer elements. FIGS. 8C, 9C and 10C show corresponding focal positions, and FIGS. 8D, 9D and 10D show the photometry values E(1) to E(3) (BV) of the divisional photometer elements 11a to 11c for the photometric areas F1 to F3.

Figure 8C:
Figure 8D:
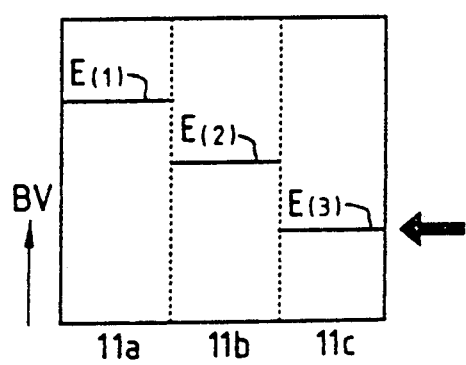
Figure 9A:
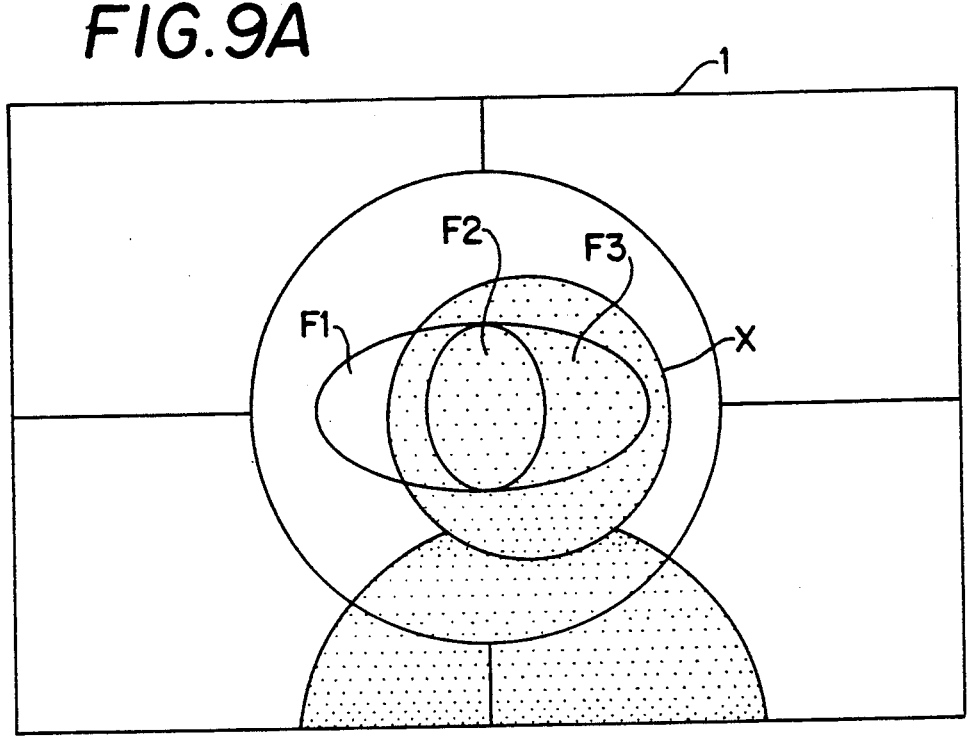
Figure 9B:
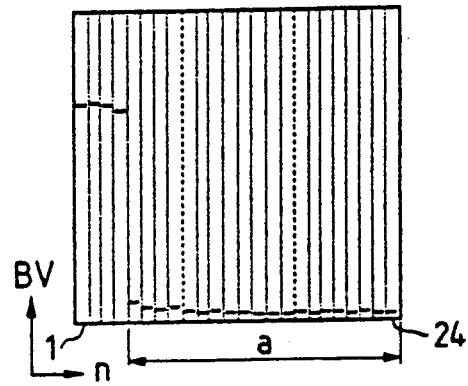
Figure 9C:
Figure 9D:
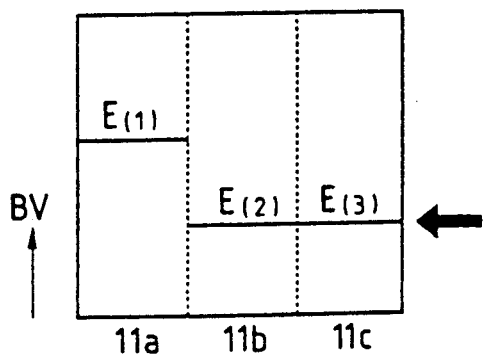

First, in FIGS. 8A to 8D, a sharply backlighted figure is positioned on the right-hand side with respect to the photometric area F2, with a large photometry-value change generated between photoelectric transfer elements No.12 and No.13. That is where an edge of the figure exists. Further, in the range indicated by the arrow a of the FIG. 8B, which corresponds to elements No.13 to 24, the photometric output of the photoelectric transfer elements is very small, so that defocus amount detection cannot be effected due to underflow of the gain control amplifier of the focus detection circuit 44. In this condition, the focus detecting section 40 detects the defocus amount of the edge section (the section around the photoelectric transfer element 12), where the photometric output is large, to effect focus detection and focusing through drive control of the photographic lens 30, so that the focal position corresponds to the edge section, as shown in FIG. 8C. Further, the photoreceptor elements 11a to 11c of the photometric areas F1 to F3 at this time output the photometry values E(1) to E(3) in the manner shown in FIG. 8D.

When exposure calculation is performed by executing the above-described control program on the basis of the photographic conditions shown in FIGS. 8A to 8D, it is determined that the principal object is in a sharply backlighted condition and that the output wave-shape pattern of the photoelectric transfer element array 43a is: MOD=4. Accordingly, exposure calculation is performed in accordance with the first algorithm, whereby the exposure value Eans=E(3), shown in step S78 of FIG. 7, is obtained. That is, in this exposure value Eans, the photometry value E(3) of the photometric area F3 corresponding to the human figure set in a sharp backlight, is preferentially adopted. In contrast to the case where the wave-shape pattern MOD=4, the exposure value when the figure is in a backlight condition and MOD=1, is obtained as: Eans=E(1), in accordance with the equation shown in step S75 of FIG. 7.

Likewise, in the case of FIGS. 9A to 9D, it is determined that the principal object is set in a sharply backlighted condition and that the output wave-shape pattern is MOD=3, with the exposure value being determined in accordance with the equation of step S77 of FIG. 7, which shows the first algorithm, as:

$$Eans=\{E(2)+E(3)\}/2 \tag{11}$$

Further, in contrast to the case where MOD=3, the exposure value when the principal object is in a backlight condition and MOD=2 is determined by the equation shown in step S76 of FIG. 7, as follows:

$$Eans=\{E(1)+E(2)\}/2 \tag{12}$$

In the case of FIGS. 10A to 10D, it is determined that the principal object is in a sharply backlighted condition and that the output wave-shape pattern is MOD=5, the exposure value Eans being determined as: Eans=E(2), in accordance with the equation shown in step S79 of FIG. 7.

The exposure value determined in this way is supplied to the exposure control section 90 in step S10 of FIG. 4. The exposure control section 90 controls the shutter mechanism section and the stop-down mechanism section (None of which is shown) on the basis of this exposure value to effect exposure.

When the principal object is thus judged to be in a sharply backlighted condition, an edge of the principal object is detected from the output wave shape of the photoelectric transfer element array 43a for focus detection to perform wave-shape sorting, and the photometry output of the photometric areas on that side of the edge where the photometry value is at a lower level is selected by an equation corresponding to the wave-shape pattern. That is, the photometry value of the photometric areas occupied by the principal object is used preferentially, thereby calculating a correct exposure value for the principal object.

Next, to be described will be the case where the principal object is in a front-light condition.

Figure 11A:
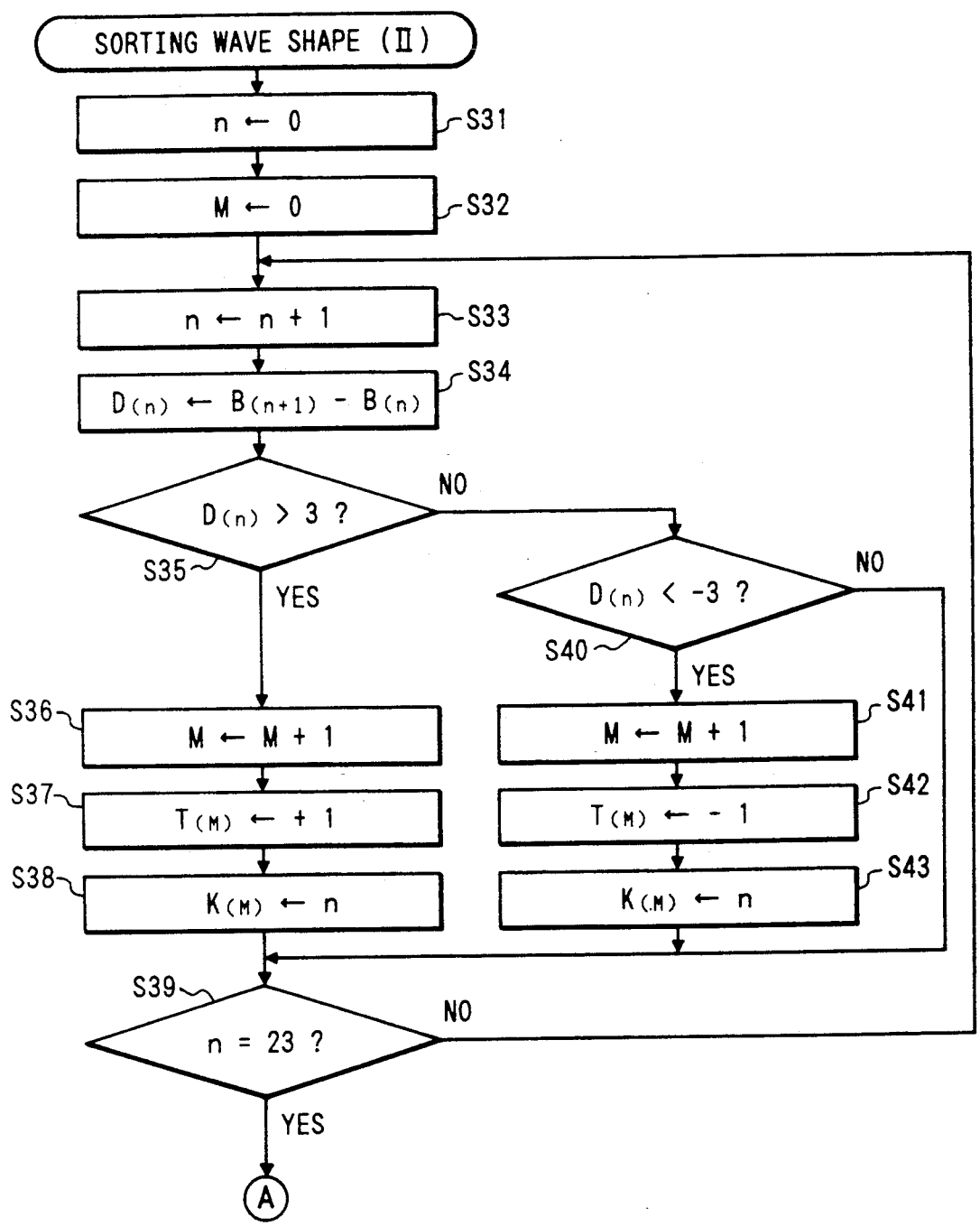

When the result of step S6 of FIG. 4 is negative, that is, when the principal object is judged not to be in a backlight condition, the procedure moves on to step S11, where a judgment is made as to whether the object is in a front-light condition or not from the flag FLGS. If the flag FLGS has been set, the procedure moves on to step S12; otherwise, it moves on to step S15. In step S12, the subroutine (II) for the wave-shape sorting of the output of the photoelectric transfer element array 43a for focus detection, shown in FIGS. 11A and 11B, is executed to perform wave-shape pattern sorting for front-light condition.

This wave-shape pattern sorting for front-light condition is substantially the same as the above-described wave-shape pattern sorting for backlight condition shown in FIGS. 6A and 6B, so those steps where the same processings are executed will be referred to by the same step numbers, with emphasis being placed on the differences between the two cases.

Figures 2, 11B:
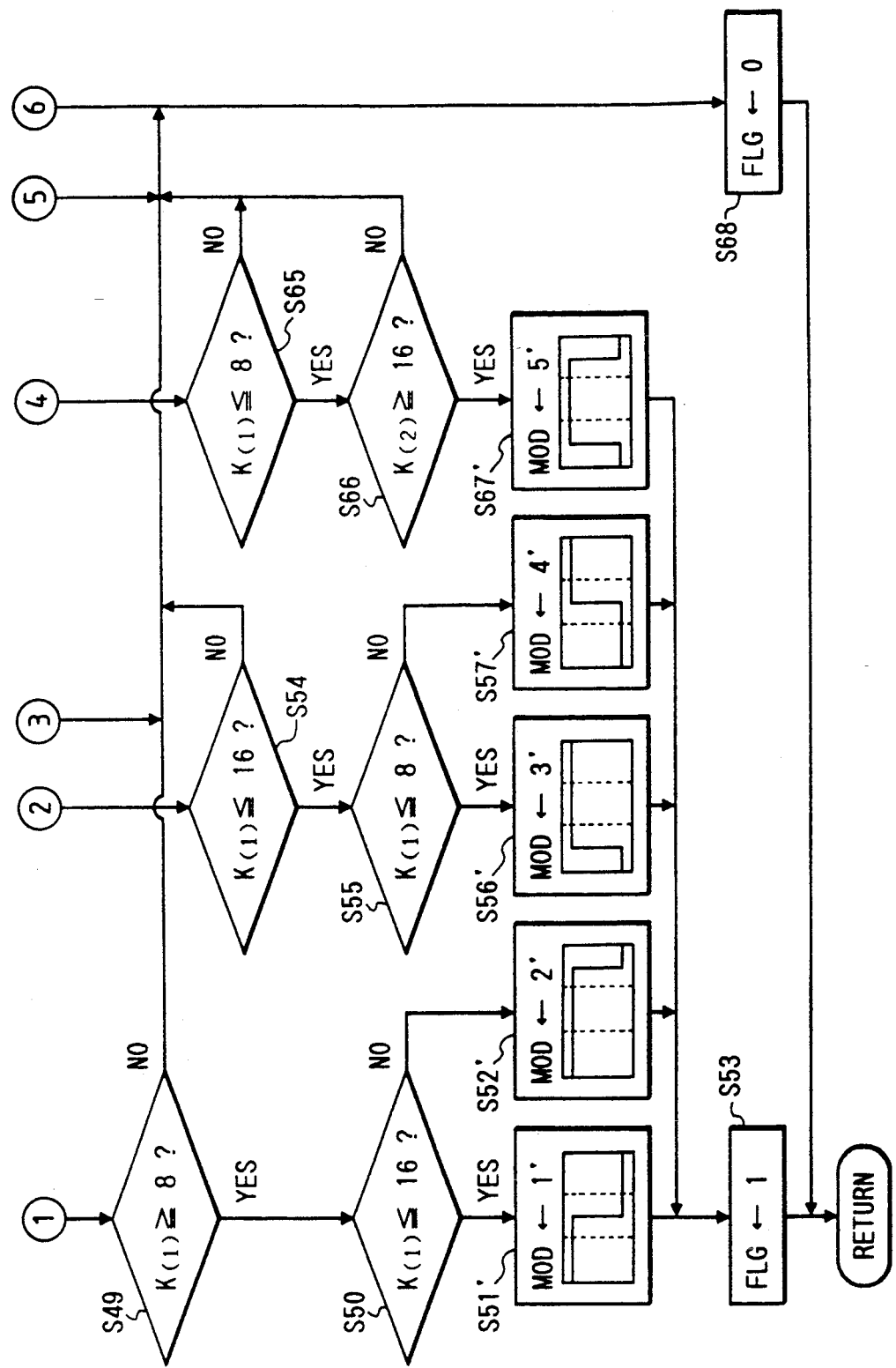

In step S48' of FIG. 11B, a judgment is made as to whether the memory T(1), which is indicative of the way the photometry value changes, is −1 or not, i.e., whether the edge detected is one across which a brighter portion passes into a darker one or not. If the result of the judgment is affirmative, the procedure moves on to step S49; if it is negative, the procedure moves on to step S54. Further, in step S63', a judgment is made as to whether the memory T(1) is +1 or not, that is, whether the first one of the two edges is one across which a darker region passes into a brighter one or not. If the result of the judgment is affirmative, the procedure moves on to step S64'; if it is negative, the procedure moves on to step S68. In the subsequent step, S64', a judgment is made as to whether the memory T(2) is −1 or not, i.e., whether the second edge is one across which a brighter portion passes into a darker one or not. If the judgment result is affirmative, the procedure moves on to step S65; if negative, it moves on to step S68.

Further, in steps S51', S52', S56', S57' and S67', where pattern numbers are to be stored in the memory MOD indicative of output wave-shape pattern, the pattern numbers 1', 2', 3', 4' and 5'are stored respectively.

After the wave-shape sorting for front-light condition has been effected, the procedure returns to the program shown in FIG. 4. In step S13, the flag FLG indicative of the completion of the output wave-shape sorting for the photoelectric transfer element array 43a is checked; if the flag is found to have been set, the procedure moves on to step S14; if not, it moves on to step S15.

Figure 12:
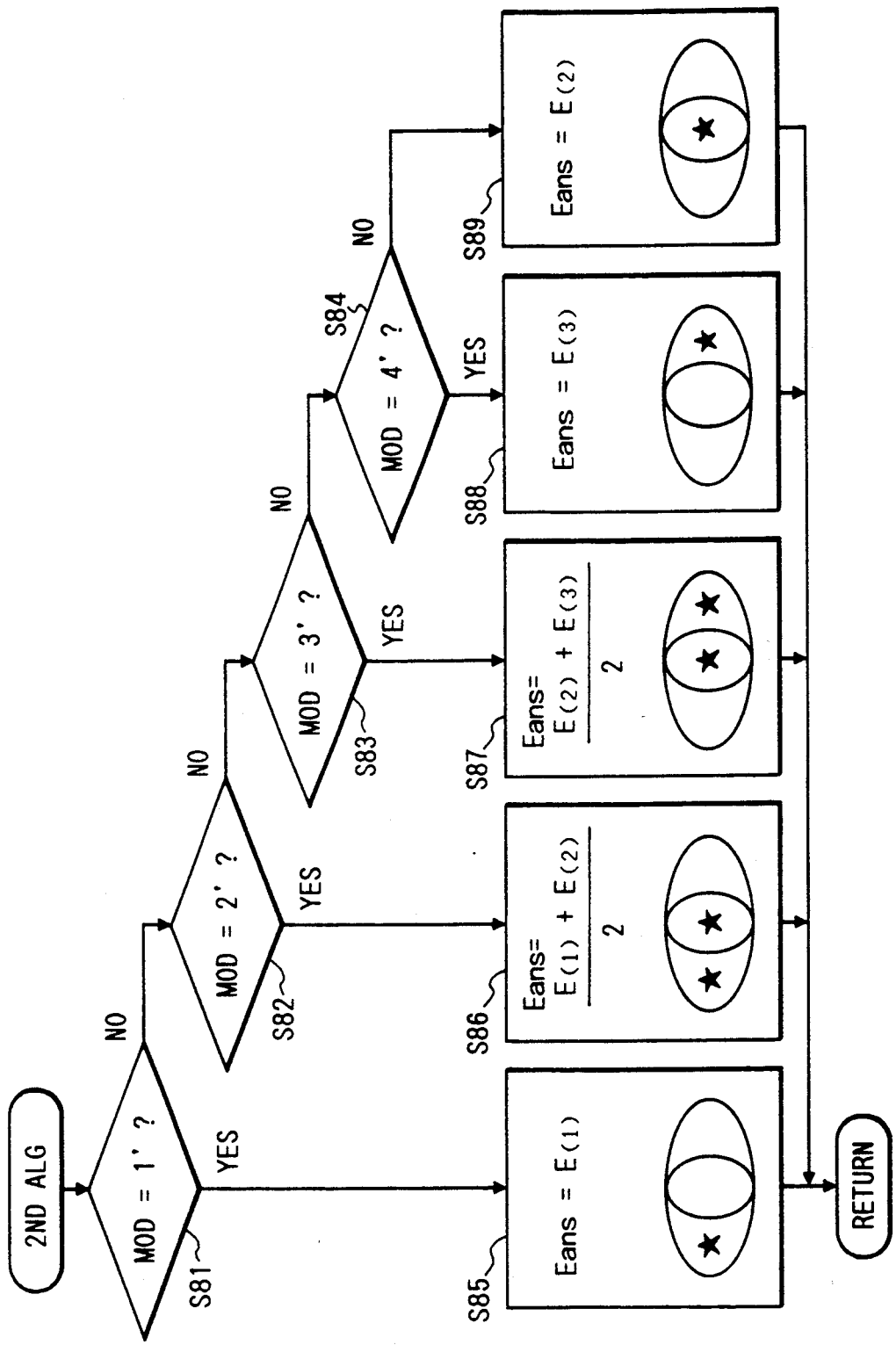
FIG. 12 is a flowchart showing a second algorithm for exposure calculation.

In step S14, the second algorithm shown in FIG. 12 is executed, calculating a correct exposure for the principal object a the front-light condition.

In steps S81 to S84 of FIG. 12, the numbers of the output wave-shape patterns, stored in the memory MOD, are checked sequentially, and a correct exposure value Eans for the principal object is determined by one of the equations shown in steps S85 to S89, selected in accordance with the output wave-shape pattern, the procedure moving on to "RETURN".

Thus, when it is determined that the principal object is in a sharply backlighted condition, an edge of the principal object is detected from the output wave shape of 0 the photoelectric transfer element array 43a for focus detection to perform wave-shape pattern sorting, and the photometry output of the photometric area which is on that side of the edge where the photometry value is at a higher level is selected by the equation corresponding to the wave-shape pattern. That is, the photometry value of the photometric areas occupied by the principal object is preferentially used, thereby calculating a correct exposure value for the principal object.

Figure 13:
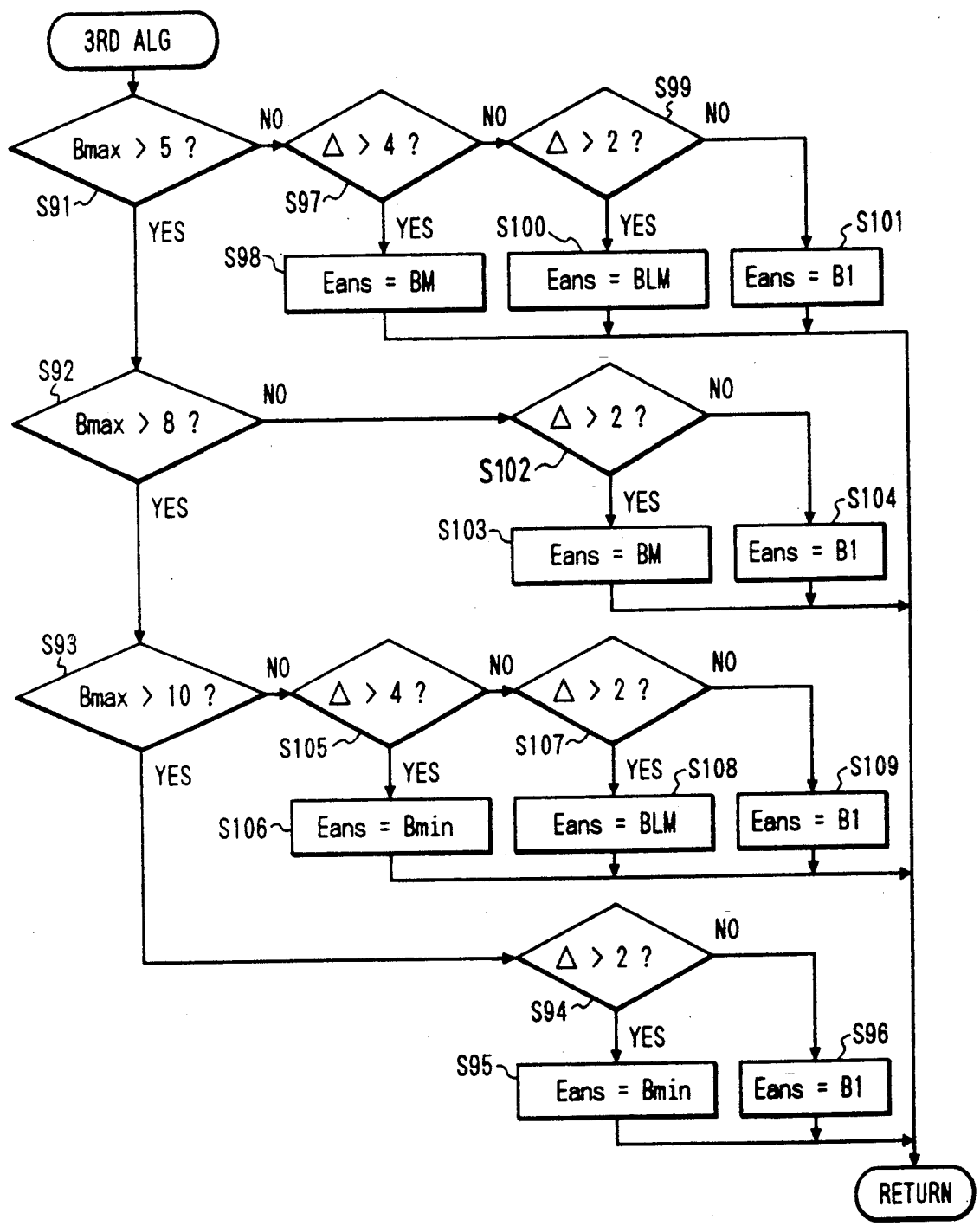
FIG. 13 is a flowchart showing a third algorithm for exposure calculation.

If the judgment results of steps S6 and S11 of FIG. 4 are both negative, that is, if it has not been discriminated between backlight and front-light conditions (in which case the field exhibits a general level of luminance distribution), the third algorithm shown in FIG. 13 is executed in step S15 to perform exposure calculation.

In the third algorithm, the exposure value Eans is selected from the following photometry values (a) to (d), in accordance with the maximum photometry value Bmax and the minimum photometry value Bmin, of the entire photometric areas F1 to F8, and the difference $\Delta(=Bmax-Bmin)$ between them:

(a) The average photometry value BM of all the photometric areas:

$$BM = \sum_{n=1}^{8} E(n)/8 \qquad (13)$$

(b) A photometry value BLM attaching importance to low luminance:

$$BLM=(BM+Bmin)/2 \qquad (14)$$

(c) The average photometry value B1 of the central photometric areas F1 to F4:

$$B1 = \sum_{n=1}^{4} E(n)/4 \qquad (15)$$

(d) The minimum photometry value Bmin.

First, when the judgment results of steps S91 to S93 have been all affirmative and it has been determined that the maximum photometry value Bmax>10BV, a judgment is further made in step S94 whether $\Delta>2$ or not. If $\Delta>2$, the minimum photometry value Bmin is selected as the exposure value Eans in step S95. If $\Delta\leq 2$, the average photometry value B1 of the central areas is selected in step S96 as the exposure value Eans.

When the result of step S93 is negative and it is determined that $10\geq Bmax>8$, and it is further determined in step S105 that $\Delta>4$, the minimum photometry value Bmin is selected in step S106, as the exposure value Eans. Further, when it is determined in step S107 that $4\geq\Delta>2$, the photometry value attaching importance to low luminance, BLM, is selected in step S109 as the exposure value Eans.

When the result of step S92 is negative and it is determined that $8\geq Bmax>5$, and it is further determined in step S102 that $\Delta>2$, the average photometry value of all the photometric areas, BM, is selected in step S103, as the exposure value Eans. When it is determined that $\Delta\leq 2$, the photometry value of the central areas, B1, is selected in step S104, as the exposure value Eans.

When the judgment result of step S91 is negative and it 25 is determined that Bmax $\leq 5$, and it is further determined in step S97 that $\Delta>4$ the average photometry value of all the photometric areas, BM, is selected in step S98 as the exposure value Eans; when it is determined in step S99 that $4\geq\Delta>2$, the photometry value attaching importance to low luminance, BLM, is selected in step S100 as the exposure value Eans. Further, when the result of step 100 is negative and it is determined that $\Delta\leq 2$, the average photometry value of the central areas, B1, is selected in step S101, as the exposure value Eans.

When the above processing has been completed, the procedure returns to the program of FIG. 4.

Thus, when the principal object is in a backlight or a front-light condition, exposure is determined by an algorithm suitable for either case, attaching importance to the photometry value for the portion corresponding to the principal object, so that correct exposure for the principal object can be obtained even in a backlight or front-light condition.

It is also possible to make a judgment only as to whether the principal object is in a condition previously selected from backlight and front-light conditions, performing corresponding exposure control. Further, the algorithms for edge detection, exposure calculation, and backlight judgment are not restricted to those of the above embodiment.

In the construction of the above embodiment, the divisional photometry section 10 constitutes the divisional photometry means 100; the photoelectric transfer element array 43a constitutes the photoelectric transfer element array 101; and the exposure calculating section 80 constitutes the edge detection means 101, the selection means 103, the exposure calculation means 104, and the judgment means 105.

Thus, in accordance with the present invention, edge information on a principal object image is detected by a photoelectric transfer element array which performs overlapping photometry at least on a part of divisional photometric areas; on the basis of this edge information, at least one of the photometry outputs of the divisional photometric areas is selected; and, on the basis of this photometry output, the exposure for the principal object is calculated, so that correct exposure for the principal object can be obtained even if it is in a sharply backlighted or front-lighted condition.

Further, since the photoelectric transfer element array for detecting edge information constitutes one of the pair of photoelectric transfer element array for focus detection, there is no need to specially provide a photoelectric transfer element array for detecting edge information, thus providing an economical exposure calculation device.

Further, when the principal object is judged to be in a backlight condition, the photometry value of the photometric areas on that side of the edge of the principal object where the photometric value is at a lower level is selected; and, when the principal object is judged to be in a front-light condition, the photometry value of the photometric areas on that side of the edge of the principal object where the photometric value is at higher level is selected; thus making it possible, as in the above case, to obtain a correct exposure for a principal object which is in a backlight or a front-light condition.

FIGS. 14 to 17B show another embodiment of the present invention.

Figure 14:
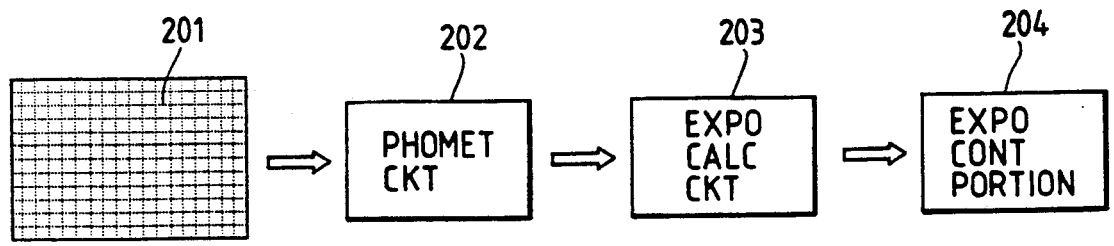
FIG. 14 is a block diagram showing an exposure calculation device.
Figure 15:
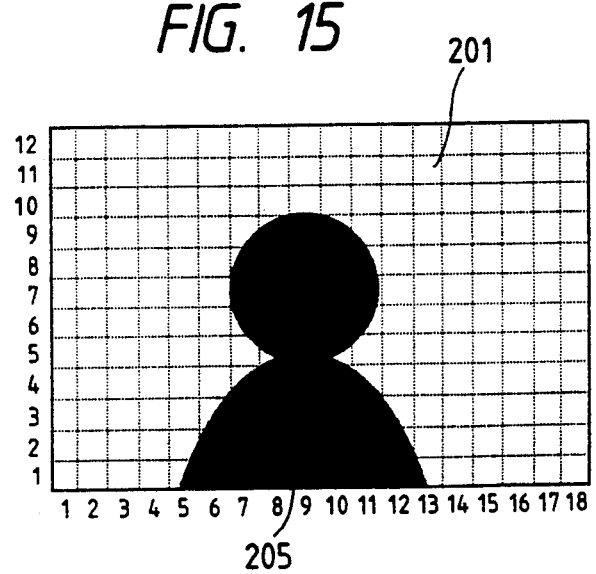
FIGS. 15 and 16 are diagrams showing how an image of an object is formed on the two-dimensional photoelectric transfer element array 201 of FIG. 14.
Figure 16:
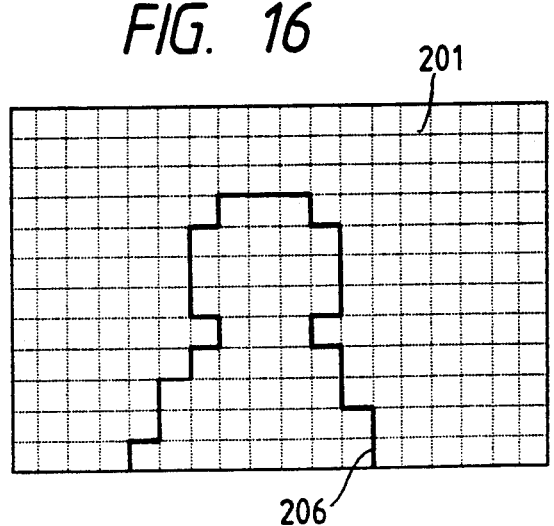
Figure 17A:
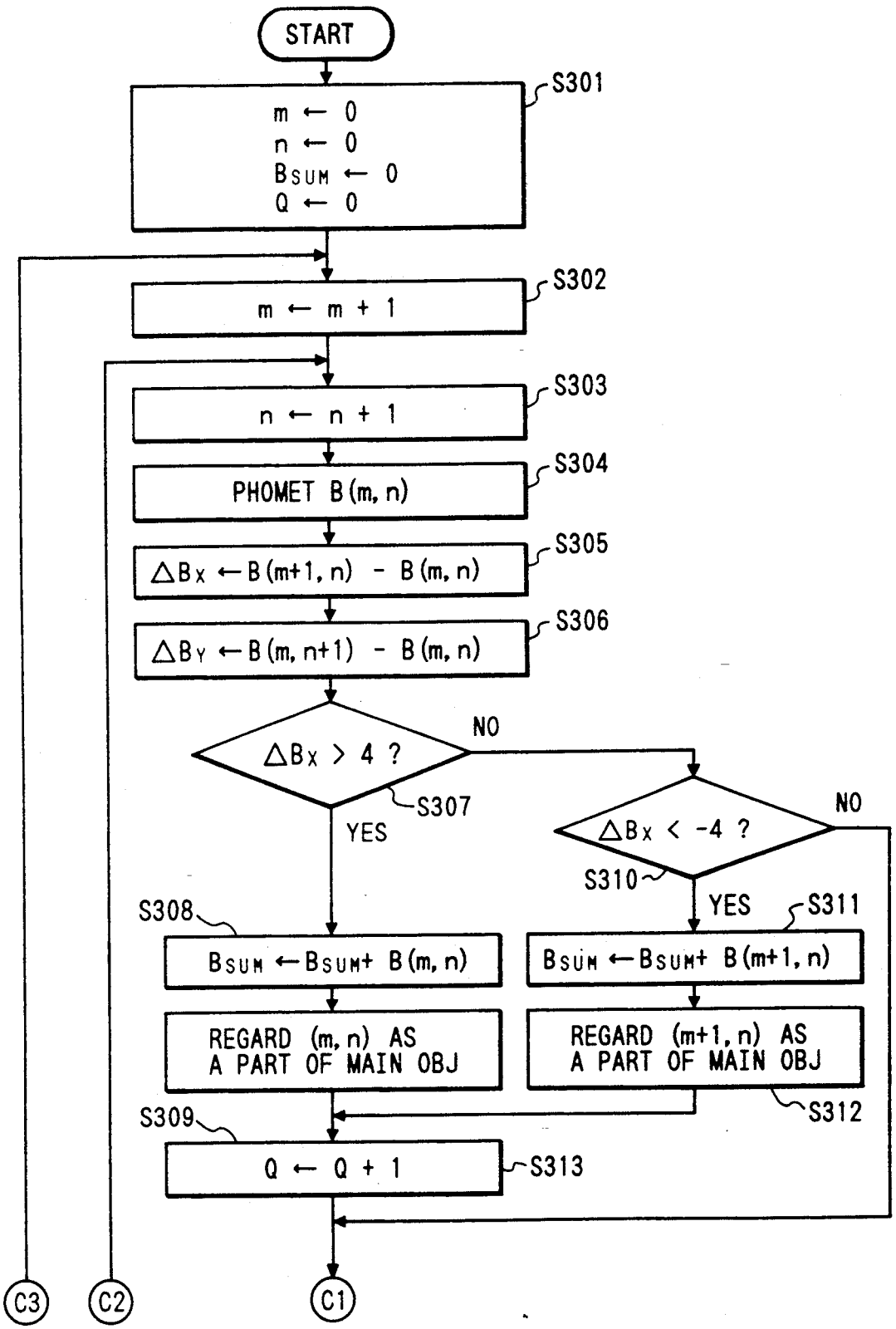
FIGS. 17A and 17B are flowcharts for a microcomputer constituting the exposure calculation circuit 203 of FIG. 14.
Figure 17B:
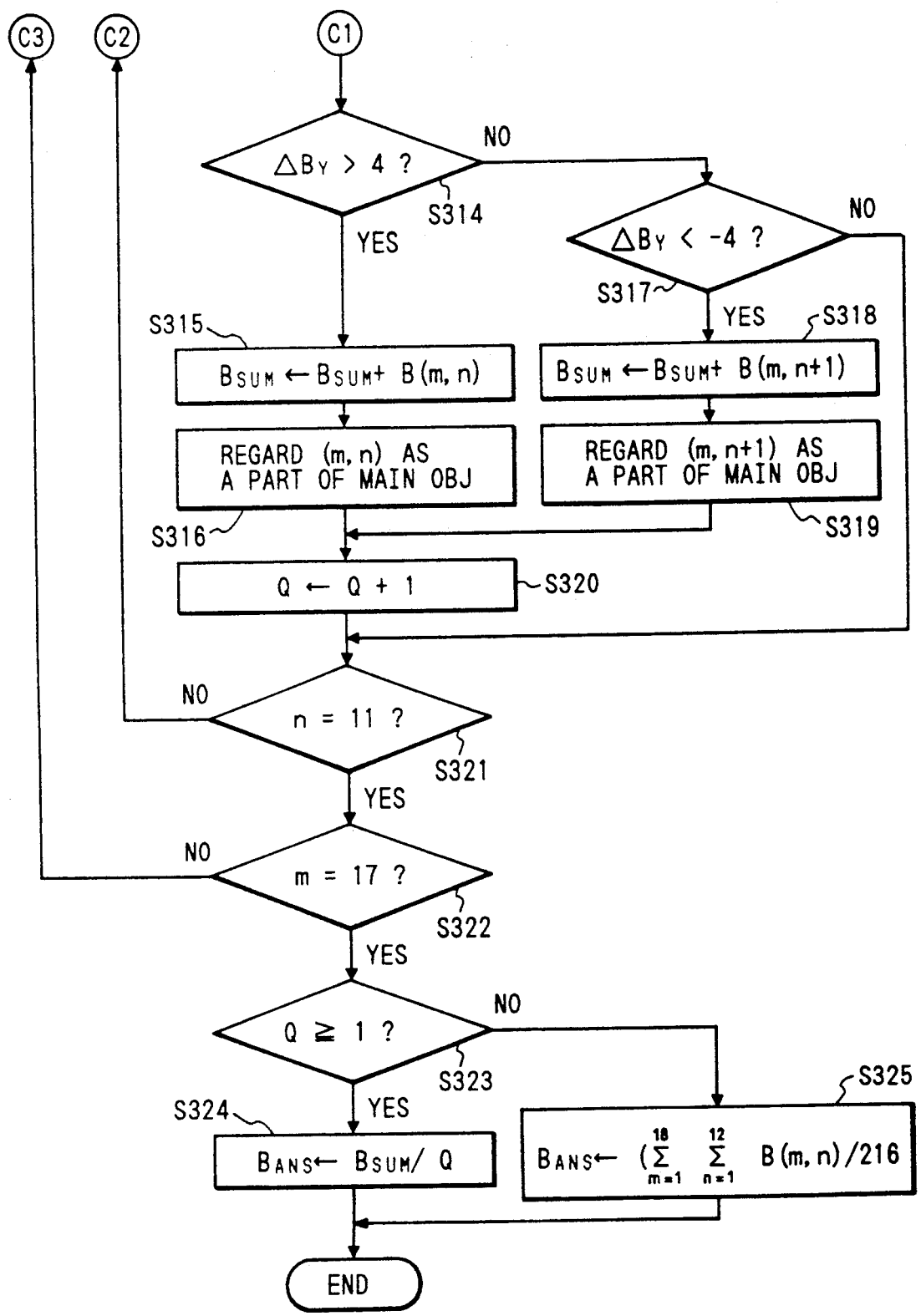

FIG. 14 is a block diagram showing an exposure calculation device; FIGS. 15 and 16 show how an object image is formed on the two-dimensional photoelectric transfer element array 201 of FIG. 14; and FIGS. 17A and 17B are flowcharts for a microcomputer constituting the exposure calculation circuit 203 of FIG. 14.

In FIG. 14, the two-dimensional photoelectric transfer array 201 is composed of 18 (horizontal) × 12 (vertical) photoelectric transfer elements. The photometry circuit 202 converts the photoelectric output of the photoelectric transfer element array 201 into a luminance value through logarithmic compression, supplying this output B(m, n) to an exposure calculation circuit 203 (m=1~18, and n=1~12). The exposure calculation circuit 203 calculates exposure value in accordance with the flowcharts of FIGS. 17A and 17B to be described below, and, on the basis of the exposure value thus obtained, the exposure control section 204 performs exposure control.

In FIG. 15, a human FIG. 205 is set in a backlight condition, with an image of the figure being formed on the photoelectric transfer element array 201. FIG. 16 shows an edge 206, which is a boundary section on the photoelectric transfer element array 201 across which adjacent photoelectric transfer elements exhibit a difference in luminance which is above a predetermined level.

Next, the calculation process for obtaining exposure value for the FIG. 205 of FIG. 15 will be described with reference to FIGS. 17A and 17B.

In step S301, an initial value of 0 is substituted for (m, n) indicative of an address on the photoelectric transfer element array, a luminance value Bsum, and a variable Q.

In steps S302 and S303, m and n are respectively incremented.

In step S304, a photometry value B(m, n), calculated by the photometric circuit 202 on the basis of the photoelectric output of the photoelectric transfer element array 201, is entered.

In step S305, the difference in luminance between those photoelectric transfer elements of the photoelectric transfer element array which are horizontally adjacent to each other is obtained as: $\Delta Bx \leftarrow B(m+1, n) - B(m, n)$.

In step S306, the difference in luminance between those photoelectric transfer elements of the photoelectric transfer element array which are vertically adjacent to each other is obtained as: $\Delta By \leftarrow B(m, N+1) - B(m, n)$.

If, in step S307, the difference in luminance in the horizontal direction, $\Delta Bx$, is larger than 4BV, the procedure moves on to step S308; if not, it moves on to step S310.

If, in step S308, the difference in luminance in the horizontal direction, $\Delta Bx$, is larger than 4BV, the lower output is added as: $Bsum \leftarrow Bsum + B(m,n)$.

In step S309, this lower output B(m, n) is regarded as corresponding to a part of the principal object, the address (m, n) of the photoelectric transfer element being stored as edge information; whereby the position of the object inside the photographic frame is determined as indicated by the edge 206 shown in FIG. 16.

If, in step S310, the difference in luminance in the horizontal direction, $\Delta Bx$, is smaller than $-4BV$, the procedure moves on to step S311; if not, it moves on to step S314.

If, in step S311, the difference in luminance in the horizontal direction, $\Delta Bx$, is smaller than $-4BV$, the lower output is added as: $Bsum \leftarrow Bsum + B(m+1, n)$.

In step S312, this lower output B(m+1, n) is regarded as corresponding to a part of the principal object, the address (m+1, n) of the photoelectric transfer element being stored as edge information; whereby the position of the object inside the photographic frame is determined as indicated by the edge 206 shown in FIG. 16.

In step S313, the variable Q is incremented.

If, in step S314, the difference in luminance in the vertical direction, $\Delta BY$, is larger than 4BV, the procedure moves on to step S315; if not, it moves on to step S317.

If, in step S315, the difference in luminance in the vertical direction, $\Delta By$, is larger than 4BV, the lower output is added as: $Bsum \leftarrow Bsum + B(m,n)$.

In step S316, this lower output B(m, n) is regarded as corresponding to a part of the principal object, the address (m, n) of the photoelectric transfer element being stored as edge information; whereby the position of the object inside the photographic frame is determined as indicated by the edge 206 shown in FIG. 16.

If, in step S317, the difference in luminance in the vertical direction, ΔBy, is smaller than −4BV, the procedure moves on to step S318; if not, it moves on to step S321.

If, in step S318, the difference in luminance in the vertical direction, ΔBy, is smaller than −4BV, the lower output is added as: Bsum←Bsum+B(m, n+1).

In step S319, this lower output B(m, n+1) is regarded as corresponding to a part of the principal object, the address (m, n+1) of the photoelectric transfer elements being stored as edge information; whereby the position of the object inside the photographic frame is determined as indicated by the edge 206 shown in FIG. 16.

In step S320, Q is incremented.

If, in step S321, n is 11, the procedure moves on to step S322; if not, it moves on to step S303.

If, in step S322, m is 17, the procedure moves on to step S323; otherwise, it moves on to step S302.

If, in step S323, Q is 1 or more, the procedure moves on to step S324; if not, it moves on to step S325.

In step S324, the sum of the luminance values of the portion on the darker side of the extracted edge 206 is divided by the addend, whereby an exposure value for the FIG. 205 is obtained as: BANS←Bsum/Q In step S325, the average value of all the luminance values is obtained as the exposure value. That is, $$BANS \leftarrow \left( \sum_{m=1}^{18} \sum_{n=1}^{12} B(m, n) \right) / 216$$

As described above, the exposure calculation circuit 203 calculates exposure value on the basis of the output of the photoelectric transfer element array 201. And, when an edge of the object 205 has been detected by the exposure calculation circuit 203, it can be assumed that the object (a human figure, etc.) is in a sharply backlighted scene, so that a correct exposure can be obtained by calculating the average value of the luminance values of the portion on the darker side of the edge 206.

Further, on the basis of the edge information, the position of the object 205 inside the photographic frame can be determined; this positional information on the object may be used not only in exposure calculation but, for example, in focus detection by an automatic focus detecting device capable of performing focus detection on a plurality of different areas in a photographic frame, whereby it is possible to select a focus detection area where the object exists.

WHAT IS CLAIMED IS:

1. An exposure calculation device for cameras, comprising:
    a divisional photometry means having a plurality of photometer elements for performing photometry respectively on each of a plurality of divisional areas constituting a field;
    a photoelectric transfer element array for performing photometry on at least a part of said field;
    an edge detection means, which extracts a boundary section defining on said photoelectric transfer element array a higher-photometry-output region and a lower-photometry-output region, outputting edge information on said boundary section;
    a selection means which selects at least one of the photometer elements of said divisional photometry means on the basis of said edge information, exposure calculation being enabled by the photometry output of the photometer element thus selected; and
    an exposure calculation means which calculates a correct exposure for a principal object in said field on the basis of the photometry output of the selected photometer element.

2. An exposure calculation device for cameras as claimed in claim 1, wherein said photoelectric transfer element array constitutes one of a pair of photoelectric transfer element arrays of a focus detecting device for performing focus detection for said principal object.

3. An exposure calculation device for cameras as claimed in claim 1, further comprising:
    a judgment means, which makes a judgment as to whether said principal object in said field is in a backlight each of the photometer elements of said divisional photometry means;
    said selection means selecting those photometer elements of said divisional photometry means which correspond to the lower-photometry-output region on said photoelectric transfer element array when the principal object is judged to be in a backlight condition by said judgment means.

4. An exposure calculation device for cameras as claimed in claim 3, further comprising:
    a sorting means for sorting the photometry output of said photoelectric transfer element array, said exposure calculation means determining a correct exposure on the basis of the sorted photometry output.

5. An exposure calculation device for cameras as claimed in claim 4, wherein said photometry output is sorted into one of five groups.

6. An exposure calculation device for cameras as claimed in claim 1, further comprising:
    a judgment means, which makes a judgment as to whether said principal object in said field is in a front-light condition or not, on the basis of the photometry output of each of the photometer elements of said divisional photometry means;
    said selection means selecting those photometer elements of said divisional photometry means which correspond to the higher photometry-output region on said photoelectric transfer element array when the principal object is judged to be in a front-light condition by said judgment means.

7. An exposure calculation device for cameras as claimed in claim 6, further comprising:
    a sorting means for sorting the photometry output of said photoelectric transfer element array, said exposure calculation means determining a correct exposure on the basis of the sorted photometry output.

8. An exposure calculation device for cameras as claimed in claim 7, wherein said photometry output is sorted into one of five groups.

9. An exposure calculation device for cameras, comprising:
    a photoelectric transfer element array for performing photometry on a field;
    an edge detection means which compares photometry outputs of adjacent photoelectric transfer elements of said array to detect an edge, which extracts a boundary section defining on said photoelectric transfer element array a higher-photometry-output region and a lower-photometry-output region, and which outputs edge information on said boundary section; and a determining means, which determines the position of a principal object in the field on the basis of said edge information.

10. An exposure calculation device for cameras as claimed in claim 9, further comprising an exposure calculation means for calculating a correct exposure from the output of said photoelectric transfer element array and the output of said determining means.

11. An exposure calculation device for cameras as claimed in claim 9, wherein said edge detection means extracts said boundary section by determining whether photometry values of adjacent elements of said photoelectric transfer element array differ by at least a predetermined amount.

12. An exposure calculation device for cameras, comprising:

a photoelectric transfer element array for performing photometry on a field;

an edge detection means which compares photometry outputs of adjacent photoelectric transfer elements of said array to detect an edge, which extracts a boundary section defining on said photoelectric transfer element array a higher-photometry-output region and a lower-photometry-output region, and which outputs edge information on said boundary section; and an exposure calculation means, which performs exposure calculation on the basis as said edge information.

13. An exposure calculation device for cameras as claimed in claim 11, wherein said edge detection means extracts said boundary section by determining whether photometry values of adjacent elements of said photoelectric transfer element array differ by at least a predetermined amount.

* * * * *